United States Patent
Shimada et al.

(10) Patent No.: US 7,836,326 B2
(45) Date of Patent: Nov. 16, 2010

(54) APPARATUS WITH VARIABLE PIPELINE STAGES VIA UNIFICATION PROCESSING AND CANCELLATION

(75) Inventors: Toshio Shimada, Nagoya (JP); Takahiro Madokoro, Nagoya (JP)

(73) Assignee: National University Corporation Nagoya University, Nagoya-shi, Aichi (JP)

( * ) Notice: Subject to any disclaimer, the term of this patent is extended or adjusted under 35 U.S.C. 154(b) by 663 days.

(21) Appl. No.: 11/878,634

(22) Filed: Jul. 25, 2007

(65) Prior Publication Data

US 2008/0133947 A1 Jun. 5, 2008

(30) Foreign Application Priority Data

Jul. 25, 2006 (WO) ................ PCT/JP2006/314683

(51) Int. Cl.
*G06F 1/04* (2006.01)
(52) U.S. Cl. ................... 713/600; 713/320; 713/400; 713/500; 713/601
(58) Field of Classification Search ........... 713/320, 713/400, 500, 600, 601
See application file for complete search history.

(56) References Cited

FOREIGN PATENT DOCUMENTS

| JP | 09-319578 | 12/1997 |
|---|---|---|
| JP | 11-161692 | 6/1999 |
| JP | 11-353052 | 12/1999 |
| JP | 2004-062281 | 2/2004 |
| JP | 2005-234968 | 9/2005 |
| JP | 2006-059068 | 3/2006 |
| WO | 01/33351 A1 | 5/2001 |

OTHER PUBLICATIONS

D. Laird, "Crusoe Processor Products and Technology," Transmeta Corporation, 2000.
Intel Corporation, "Intel Pentium M Processor Datasheet," 2003.
Advanced Micro Devices, Inc., Mobile AMD Athlon 4 Processor Model 6 CPGA Data Sheet, 2001.
Shimada, et al., "Pipeline Stage Unification: A Low-Energy Consumption Technique for Future Mobile Processors," Symposium on Advanced Computing Systems and Infrastructures, SACSIS2003, pp. 283-290, 2003.

(Continued)

*Primary Examiner*—Tse Chen
(74) *Attorney, Agent, or Firm*—McGinn IP Law Group, PLLC

(57) ABSTRACT

To satisfy a required processing speed and achieve the maximum power-saving effect in a microprocessor. A control value is calculated by performing proportional and integral processing on a deviation of a target instruction execution number from a measured instruction execution number. Unification processing or unification cancellation processing is performed in accordance with the control value. The unification processing stops supply of clocks to selected pipeline registers and controls the pipeline such that a signal passes through the pipeline registers so as to reduce the number of stages of the pipeline. The unification cancellation processing resumes the supply of clocks to the selected pipeline registers and controls the pipeline such that the pipeline registers latch the signal in synchronism with the clocks so as to increase the number of stages of the pipeline. The frequency of clocks supplied to the pipeline registers is changed in accordance with the changed number of stages.

20 Claims, 19 Drawing Sheets

OTHER PUBLICATIONS

Shimada, et al., "Pipeline Stage Unification: A Low-Energy Consumption Technique for Future Mobile Processors," In ISLPED2003, pp. 326-329, 2003.

Shimada, et al., "Pipelinig with Variable Depth for Low Power Consumption," in IPSJS16. Technical Reports, vol. 2001-ARC-145, pp. 57-62, 2001.

Shimada, et al., "A Hybrid Power Reduction Mechanism Using Pipeline Stage Unification and Dynamic Voltage Scaling," SACSIS2004, pp. 11-18, 2004.

Shimada, et al., "Power Consumption Reduction through Combining Pipeline Stage Unification and DVS," vol. 48 No. SIG 3, pp. 75-87, Feb. 2007.

Form PCT/IB/338.

Form PCT/IB/373.

Translation of Form PCT/ISA/237.

APPARATUS WITH VARIABLE PIPELINE STAGES VIA UNIFICATION PROCESSING AND CANCELLATION

TECHNICAL FIELD

The present invention relates to a processing apparatus which has a pipeline processing function and which can reduce power consumption. In particular, the present invention relates to an apparatus which can reduce power consumption of a microprocessor.

BACKGROUND ART

Mobile processors have recently been required to realize low power consumption and high performance. In order to satisfy these requirements, a scheme called "DVS (dynamic voltage scaling)" is currently used. DVS is known from, for example, the following Non-Patent Documents 1, 2, and 3. DVS dynamically changes clock frequency and power supply voltage in accordance with a required battery duration or processor load. When the required battery duration is long or the processing load is low, the clock frequency is lowered, and the power consumption is reduced. Further, delay of signals is adjusted so as to match a prolonged clock cycle time, and power supply voltage is lowered. Thus, the power consumption during execution of programs is reduced. Although DVS is an effective method for reducing power consumption, its effectiveness will diminish in future processing techniques, from the viewpoints that decreasing threshold voltage becomes difficult because of an increase in subthreshold leakage current, and that transient faults increase.

As an alternative, a method called "pipeline stage unification (PSU)" has been proposed as disclosed in the following Non-Patent Documents 4, 5, and 6. Although PSU is simple, it can reduce power consumption effectively. As in the case of DVS, PSU lowers clock frequency so as to reduce power consumption of a processor. However, unlike DVS, PSU does not lower the power supply voltage, but unifies a plurality of pipeline stages by bypassing pipeline registers. PSU can reduce power consumption by means of the following two phenomena.

First, the total load of clock drivers can be reduced by stopping supply of clocks to the bypassed pipeline registers. Further, since the pipeline registers for which supply of clocks is stopped do not operate, power consumption can be reduced by an amount corresponding to power consumed through operation of D-FFs. Second, due to unification of pipeline stages, the pipeline of a processor becomes short. As a result, the number of clock cycles required to execute a program becomes equal to or less than that of a processor which operates at the same clock frequency and uses DVS, whereby a time period in which power is consumed can be shortened. For example, penalties from branch prediction misses are reduced by reducing the number of pipeline stages of an instruction fetch portion and a decode portion of a front end pipeline portion, whereby the number of execution cycles is reduced. The above-described effects are expected.

Meanwhile, Patent Document 1 listed below discloses an apparatus which changes the number of pipeline stages in accordance with clock frequency. That is, when high-speed processing is required, processing is performed at a high clock frequency in a large number of stages so that only a small difference in processing time is produced among these stages. When high-speed processing is not required, processing is performed at a low clock frequency in a small number of stages so that the number of penalties from branch interlock decreases, and power consumption decreases.

Patent Document 2 listed below discloses a processing apparatus which includes a plurality of modules and in which, for each instruction word, supply of clocks to unused modules is stopped so as to reduce power consumption.

Patent Document 3 listed below discloses a method of estimating power consumption of a processor. Patent Document 4 listed below discloses a technique for increasing and decreasing the clock frequency of a CPU so as to increase a performance index within a given power consumption index range.

[Non-Patent Document 1]
D. Laird, "Crusoe Processor Products and Technology," Transmeta Corporation, 2000.

[Non-Patent Document 2]
Intel Corporation, "Intel Pentium M Processor Datasheet," 2003.

[Non-Patent Document 3]
Advanced Micro Devices, Inc., "Mobile AMD Athlon 4 Processor Model 6 CPGA Data Sheet," 2001.

[Non-Patent Document 4]
So Shimada, Hideki Ando, Toshio Shimada, "Variable Pipeline for Lowering Power Consumption," Research Report of Information Processing Society of Japan, Vol. 2001-ARC-145, pp. 57-62, 2001.

[Non-Patent Document 5]
So Shimada, Hideki Ando, Toshio Shimada, "Pipeline Stage Unification: A Low-Energy Consumption Technique for Future Mobile Processors," Symposium on Advanced Computing Systems and Infrastructures, SACSIS2003, pp. 283-290, 2003.

[Non-Patent Document 6]
Hajime Shimada and Hideki Ando and Toshio Shimada, "Pipeline Stage Unification: A Low-Energy Consumption Technique for Future Mobile Processors," In ISLPED2003, pp. 326-329, 2003.

[Patent Document 1]
Japanese Patent Application Laid-Open (kokai) No. H9-319578

[Patent Document 2]
Japanese Patent Application Laid-Open (kokai) No. 2005-234968

[Patent Document 3]
Japanese Patent Application Laid-Open (kokai) No. H11-161692

[Patent Document 4]
Japanese Patent Application Laid-Open (kokai) No. H11-353052

Problems to be Solved by the Invention

However, there has not been known a processing apparatus which performs pipeline control, and which satisfies a target performance that changes in accordance with a task, while reducing power consumption. Since recent processing apparatuses such as microprocessors have been designed to operate at higher and higher speeds, their power consumptions have increased accordingly. Therefore, it is desired to develop a processing apparatus which achieves a desired execution speed, while reducing power consumption.

The present invention has been accomplished to solve the above-described problem, and its object is to reduce power consumption to an extent possible while satisfying processing end time required in relation to each task.

The processing speed is not necessarily required to be the maximum at all times, and may be low depending on the type of task. That is, there is a designated time by which a certain result must be obtained, and it is sufficient to perform processing at the lowest speed which satisfies that condition.

In consideration of the above, the present invention reduces power consumption to a possible extent in a range in which an average number of instructions actually performed per unit time (throughput) reaches a required number of instructions to be performed per unit time.

Means for Solving the Problems

In order to solve the above-described problem, a first invention provides a processing apparatus in which logic circuits are connected in series by pipeline registers and which performs pipeline processing, the apparatus comprising instruction-execution-number measurement means for measuring an instruction execution number, which is the number of instructions executed per unit time; target-instruction-execution-number setting means for setting a target instruction execution number, which is a target number of instructions to be executed per unit time; control value calculation means for calculating a control value by performing proportional and integral processing on a deviation of the target instruction execution number set by the target-instruction-execution-number setting means from the instruction execution number measured by the instruction-execution-number measurement means; stage number changing means for changing the number of stages of the pipeline by performing unification processing or unification cancellation processing in accordance with the control value calculated by the control value calculation means, the unification processing being adapted to stop supply of clocks to selected pipeline registers and control the pipeline such that a signal passes through the pipeline registers, so as to partially connect the stages of the pipeline to thereby reduce the number of stages of the pipeline, and the unification cancellation processing being adapted to resume the supply of clocks to the selected pipeline registers and control the pipeline such that the pipeline registers latch the signal in synchronism with the clocks, so as to separate the connected stages of the pipeline to thereby increase the number of stages of the pipeline; and clock frequency changing means for changing a frequency of clocks supplied to the pipeline registers in accordance with the number of stages changed by the stage number changing means.

Here, the instruction-execution-number measurement means, which measures the number of instructions executed per unit time, is formed by a circuit which actually measures, for example, the number of times of update of a program counter, the number of times of loading of data into the program counter, or the number of fetch cycles per predetermined time. The number of instructions executed per unit time can be measured from the number of times of update. Further, the average number of clocks required to execute a single instruction can be measured by obtaining the average number of clocks required to increment the program counter by 1, and since the clock cycle is known, the average time required to execute a single instruction can be measured. Thus, the number of instructions executed per unit time can be obtained. Instead of measuring the number of times of update of the program counter, it is possible to count a signal from which the end of execution of a single instruction can be determined.

The target number of instructions to be executed per unit time is set in accordance with a time which can be used for a task to be processed, the type of calculation, etc. The feature of the present invention resides in that the number of stages of the pipeline is controlled such that the actually measured number of instructions executed per unit time follows the set target number of instructions to be executed per unit time. Therefore, the number of instructions executed per unit time may be a value related thereto. Since the average execution time or cycle number of a single instruction is a value equivalent to the number of instructions executed per unit time, controlling the average execution time or average cycle number of a single instruction to a target average execution time or target cycle number falls within the scope of the present invention.

As is well known, the control value obtained through proportional and integral processing is a value obtained by multiplying a cumulative value of deviations in a predetermined past period and a deviation in the current control period by respective coefficients and adding the resultant values together. The characteristics of the follow-up control can be changed by changing the coefficients (gains) of the integral terms and the proportional term. The control cycle for changing the number of stages of the pipeline is arbitrary. However, the number of stages can be controlled such that the number of stages does not change at least in control periods of 100 ms, for example. The time over which the number of executed instruction is measured may be equal to or shorter than the control period.

Further, the first invention encompasses a case where the coefficient of the proportional term is zero; that is, the control value includes the integral term only.

In general, the pipeline is divided into a plurality of stages such that processing time becomes equal among the stages. In such a case, when the number of stages is to be reduced, the number of stages is reduced to ½, ¼, and then ⅛ by unifying adjacent two stages. However, in a case where the stages differ in processing time, the number of stages may be reduced by arbitrarily unifying adjacent stages such that processing time becomes equal among the stages formed through the unification.

In order to reduce the number of stages, there may be provided a signal line which transmits a stop signal for stopping supply of clocks to the pipeline registers, and a logic circuit which receives the stop signal and clocks. When the stop signal is input to the logic circuit, the logic circuit prohibits the supply of the clocks to the pipeline registers. Further, the pipeline registers are configured such that when the clocks are stopped, the pipeline registers allow input signals to pass therethrough, without latching them.

The control for changing the number of stages in accordance with the control value may be performed such that the number of stages decreases or increases by one stage only in adjacent control periods so as to prevent the number of stages from abruptly changing by two or more stages, or such that the number of stages is changed in accordance with the magnitude of the control value in a state in which changing of two or more stages is permitted. In generally, a higher power-saving effect is attained when abrupt changes in the number of stages are prevented such that the number of stages does not change by two or more stages in each control period.

The clock frequency is controlled such that the smaller the number of stages of the pipeline, the lower the clock frequency; i.e., the longer the clock cycle and such that the larger the number of stages of the pipeline, the higher the clock frequency; i.e., the shorter the clock cycle (second aspect). Since an increased number of logic circuits in each stage increases the processing time, the clock cycle must be increased.

The control value may includes a differential term of the deviation in addition to the proportional term and the integral term (third aspect). The deviation is a value obtained by subtracting the measured number of instructions performed per unit time from the target number of instructions performed per unit time. When the number of stages does not change, the deviation can continuously change in accordance with the task. The followability to the target instruction execution number can be improved by reflecting this change trend on the changing of the number of stage.

A fourth invention is directed to the processing apparatus according to any one of claims 1 to 3 and characterized in that the stage number changing means performs the unification processing for decreasing the number of stages when the control value obtained by the control value calculation means is smaller than a predetermined value, and performs the unification cancellation processing for increasing the number of stages when the control value is larger than the predetermined value.

In general, when the control value is zero, the average value (hereinafter referred to as "current average instruction execution speed") of the actual number of instructions executed per unit time (hereinafter referred to as "current instruction execution speed") is controlled to become equal to the target number of instructions to be executed per unit time (hereinafter referred to as "target instruction execution speed"). When the control value is positive, the current average instruction execution speed is lower than the target instruction execution speed. When the control value is negative, the current average instruction execution speed is higher than the target instruction execution speed.

Accordingly, when the control value becomes positive, the number of stages is increased so as to increase the current average instruction execution speed; and when the control value becomes negative, the number of stages is decreased so as to decrease the current average instruction execution speed. In a case where the number of stages is classified, the number of stages may be prevented from abruptly changing such that the number of stages changes to the number of stages of a one-class-higher class or the number of stages of a one-class-lower class, or the number of stages may be caused to abruptly change such that the number of stages changes to, for example, the number of stages of a two-class higher class or the number of stages of a two-class lower class. The present invention encompasses these cases. These controls cause the current average instruction execution speed to follow the target instruction execution speed. In general, the above-mentioned predetermined value is zero, but is not limited thereto.

A fifth invention is directed to the processing apparatus according to any one of claims 1 to 4 and characterized in that when the control value is equal to or less than a first threshold, the stage number changing means performs the unification processing such that the number of stages changes to the number of stages of a one-class-lower class; and when the control value is equal to or greater than a second threshold greater than the first threshold, the stage number changing means performs the unification cancellation processing such that the number of stages changes to the number of stages of a one-class-higher class.

In general, the first threshold assumes a negative value, and the second threshold assumes a positive value. When the control value is present between the first threshold and the second threshold, the number of stages does not change. When the control value is equal to or less than the first threshold, since the current average instruction execution speed is greater than the target instruction execution speed by an amount greater than the absolute value of the first threshold, the unification processing is performed such that the number of stages changes to the number of stages of a one-class-lower class. When the control value is equal to or greater than the second threshold, since the current average instruction execution speed is less than the target instruction execution speed by an amount greater than the second threshold, the unification cancellation processing is performed such that the number of stages changes to a larger number of stages of a one-class-higher class. These controls cause the current average instruction execution speed to accurately follow the target instruction execution speed.

A sixth invention is directed to the processing apparatus according to claim 1 or 2 and characterized in that when both the integral term and the proportional term of the control value are negative, the stage number changing means performs the unification processing such that the number of stages changes to the number of stages of a one-class-lower class; when both the integral term and the proportional term of the control value are positive, the stage number changing means performs the unification cancellation processing such that the number of stages changes to the number of stages of a one-class-higher class; and when the product of the integral term and the proportional term of the control value is negative or zero, the stage number changing means does not change the number of stages.

In this control, the control for changing the number of stages in accordance with the control value is performed on the basis of the integral term and proportional term, separately, of the control value.

A seventh invention is directed to the processing apparatus according to any one of claims 1 to 6 and characterized in that even when the unification cancellation processing is executed in a certain control period and a condition for performing the unification cancellation processing is satisfied in a control period subsequent to the certain control, the stage number changing means does not perform the unification cancellation processing and maintains the number of stages if the control value or the deviation of the average value of the measured instruction execution number per unit time from the target instruction execution number shows a tendency to increase; and even when the unification processing is executed in a certain control period and a condition for performing the unification processing is satisfied in a control period subsequent to the certain control, the stage number changing means does not perform the unification processing and maintains the number of stages if the control value or the deviation of the average value of the measured instruction execution number per unit time from the target instruction execution number shows a tendency to decrease.

The present invention prevents the class of the number of stages from continuously changing to a higher class or a lower class in successive control periods. When the class is caused to continuously change to a higher class or a lower class in successive control periods, the change width of the number of stages increases, and the power-saving effect is not high. Accordingly, in the present invention, the class of the number of stages is prevented from greatly changing. That is, when the unification cancellation processing is performed so as to change the number of stages to the number of stages of a one-class-higher class, the current average instruction execution speed ought to increase. Therefore, in a case where the control value or the deviation of the current average instruction execution speed from the target instruction execution speed shows a tendency to increase, even when the condition for performing the unification cancellation processing for changing the number of stages to the number of stages of a one-class-higher class is still satisfied in the next control period, the processing for increasing the number of stages is not performed. With this control, abrupt increase of the number of stages is prevented.

In contrast, when the unification processing is performed so as to change the number of stages to the number of stages of a one-class-lower class, the current average instruction execution speed ought to decrease. Therefore, in a case where the control value or the deviation of the current average instruction execution speed from the target instruction execution speed shows a tendency to decrease, even when the condition for performing the unification processing for changing the number of stages to the number of stages of a one-class-lower class is still satisfied in the next control period, the processing for decreasing the number of stages is not performed. With this control, abrupt decrease of the number of stages is prevented. By virtue of these controls, more effective power saving can be realized.

An eighth invention is directed to the processing apparatus according to any one of claims 1 to 6 and characterized in that the stage number changing mean restricts the switching of the number of stages to a number of stages of a first class in which the control value or the deviation (the target instruction execution speed—the current instruction execution speed) associated with the set target instruction execution number becomes negative and a number of stages of a second class which is adjacent to the first class and in which the control value or the deviation becomes positive.

When an instruction is executed at the number of stages of a class having an instruction execution speed equal to or higher than the target instruction execution speed, the deviation in that control period becomes negative, and when the execution is continued for a while with the number of stages maintained, the control value also becomes negative. In contrast, when an instruction is executed at the number of stages of a class having an instruction execution speed equal to or lower than the target instruction execution speed, the deviation becomes positive, and when the execution is continued for a while with the number of stages maintained, the control value also becomes positive. This condition determination makes it possible to find classes having numbers of stages at which the current instruction execution speeds sandwiching the target instruction execution speed can be obtained in a period in which an actual task is executed.

The reason why these classes must be obtained real time is that since the type of instruction word changes depending on a task, the current instruction execution speed at each class changes, and a required performance; that is, the target instruction execution speed changes. Therefore, it is necessary to determine two classes between which the target instruction execution speed is actually present. Notably, in a case where the control value includes the integral term only, adjacent two classes at which two current average instruction execution speeds sandwiching the target instruction execution speed can be obtained are determined on the basis of the results of determination as to whether the value of (the target instruction execution speed—the current average instruction execution speed) is positive or negative.

The present invention is characterized by controlling the changing of the number of stages, while restricting the number of stages to two adjacent classes determined real time as described above. Restricting the classes of the number of stages means that, in the control corresponding to the control value, the number of stages is not increased to a number greater than the number of stages of the first class even when a determination that the current instruction execution speed must be increased is made in successive control periods, and the number of stages is not decreased to a number less than the number of stages of the second class even when a determination that the current instruction execution speed must be decreased is made in successive control periods. Even when the number of stages is controlled in the above-described manner, the control value is sooner or later controlled to the vicinity of zero, insofar as the first and second classes are detected real time, and the target instruction execution speed is present between the instruction execution speeds of these classes. By virtue of this control, more effective power saving can be achieved. Moreover, when the target instruction execution speed changes, the first and second classes can be changed in accordance with the changed target instruction execution speed. Therefore, even in such a case, it is possible to cause the current average instruction execution speed to follow the target instruction execution speed.

A ninth invention is directed to the processing apparatus according to any one of claims 1 to 6 and characterized in that a number of stages at which the control value or the deviation associated with the set target instruction execution number becomes negative is defined as a number of stages of a first class; a number of stages which is a number of stages of a class adjacent to the first class and at which the control value or the deviation becomes positive is defined as a number of stages of a second class; and when the number of stages before being changed is the number of stages of the first class, the control value is corrected in accordance with the number of stages before being changed, so as to increase the probability at which the number of stages of the second class is selected.

In the present invention, similar to the eighth invention, adjacent two classes at which two current instruction execution speeds sandwiching the target instruction execution speed can be obtained are detected real time. Subsequently, when the number of stages in a certain control period is the number of stages of the first class, in the next control period, the control is performed so as to increase the probability at which the number of stages of the second class, which is one-class-lower than the first class and is smaller in the number of stages, is selected. As described above, the current instruction execution speed is deliberately is increased by an amount greater than the actual amount to thereby decrease the control value. In such a case, when a task is executed at the number of stages of the first class in a certain control period, in the next control period, the class is prevented from being changed to a higher class having a larger number of stages. That is, the probability at which the number of stages of the second class which is high in power-saving effect is selected is intentionally increased. After the task is executed at the second class, the task is executed at the number of stages of the first class. Accordingly, the number of stages is prevented from increasing from the number of stages of the first class to the number of classes of a higher class. That is, the above control increases the probability at which an instruction is executed while the number of stages is restricted to the number of stages of the first class and the number of stages of the second class.

A tenth invention is directed to the processing apparatus according to any one of claims 1 to 6 and characterized in that the number of stages can be changed to a maximum number of stages, an intermediate number of stages, and a minimum number of stages; and the control value calculation means corrects the control value in accordance with the number of stages before being changed such that the probability at which the intermediate number of stages is selected increases.

In the case where the number of stages can be changed to the maximum number of stages, the intermediate number of stages, and the minimum number of stages, if the probability at which the intermediate number of stages is selected is intentionally increased, the number of stages is prevented from successively increasing to the maximum number of stages after having increased to the intermediate number of stages. Similarly, the number of stages is prevented from successively decreasing to the minimum number of stages after having decreased to the intermediate number of stages.

An eleventh invention is characterized by comprising supply voltage control means for lowering supply voltage in accordance with the number of stages and the clock frequency in control performed at the number of stages changed by the stage number changing means.

A twelfth invention is characterized in that the supply voltage control means gradually decreases or increases the supply voltage when the number of stages is changed.

A thirteenth invention is characterized by comprising DVS control means for continuously changing the clock frequency and the supply voltage in accordance with the control value when the number of stages is changed by the stage number changing means.

Effects of the Invention

In the first and second inventions, the number of stages of the pipeline is feedback-controlled such that the average value of the actually measured number of instructions executed per unit time in a predetermined past period (the current average instruction execution speed) follows the set target number of instructions to be executed per unit time (the target instruction execution speed). When the number of stages of the pipeline decreases, supply of clocks to pipeline registers through which a signal is passed is stopped, and the clock frequency is changed in accordance with the number of stages of the pipeline. As a result, the smaller the number of stages of the pipeline, the smaller the power consumption. Further, when the stages of the pipeline are unified, the instruction execution number (IPC) in a single clock cycle becomes about 1.46 times that before the unification. Therefore, even when the clock frequency decreased to ½, the current instruction execution speed decreases only to about 0.73 times the current instruction execution speed before the unification. In the case of DVS control, the current average instruction execution speed decreases to ½ through one-stage unification. Accordingly, when the target instruction execution speed in the PSU control and the target instruction execution speed in the DVS control are the same, the PSU control can save electrical power more than the DVS control (see FIG. 19). Accordingly, electrical power can be saved to the maximum extent in a range in which a target performance (target instruction execution speed) required and set in accordance with a task is attained.

In the third invention, since the differential term of the deviation is added to the control value, the followability to the target instruction execution speed is improved. For example, when the sign of the differential term differs from those of the integral term and the proportional term, the differential term prevents the number of stages from greatly changing. Therefore, more effective power saving is achieved.

In the fourth invention, in the case where the predetermined value is set to zero, for example, when the control value is negative, it means that the current average instruction execution speed is higher than the target instruction execution speed. Therefore, the unification processing for decreasing the number of stages of the pipeline is performed. When the control value is positive, it means that the current average instruction execution speed is lower than the target instruction execution speed. Therefore, the unification cancellation processing for increasing the number of stages of the pipeline is performed. With this control, the current average instruction execution speed accurately follows the target instruction execution speed without any delay.

In the fifth invention, first and second thresholds are set for determination of the magnitude of the control value. When the control value is present between the first threshold and the second threshold, the number of stages is not changed. When the control value is equal to or less than the first threshold or when the control value is equal to or greater than the second threshold, the unification processing for decreasing the number of stages to the number of stages of a one-class-lower class or the unification cancellation processing for increasing the number of stages to the number of stages of a one-class-higher class is performed. Accordingly, frequency change of the number of stages is prevented. In addition, since only a one-stage change is permitted in a single control period, great change of the number of stages is prevented. As a result, classes which greatly differ in the number of stages are prevented from alternately being selected, whereby the power-saving effect is enhanced.

In the sixth invention, determination of the magnitude of the control value is performed on the basis of the integral term and proportional term, separately, of the control value. When both the integral term and the proportional term are negative, it means that both the past average instruction execution speed and the current instruction execution speed are higher than the target instruction execution speed. Therefore, the unification processing for decreasing the number of stages is performed. In contrast, when both the integral term and the proportional term are positive, it means that both the past average instruction execution speed and the current instruction execution speed are lower than the target instruction execution speed. Therefore, the unification cancellation processing for increasing the number of stages is performed. When the product of the integral term and the proportional term is zero or negative, it means that the current average instruction execution speed is likely to approach the target instruction execution speed in the next control period. Therefore, the number of stages is not changed. In this manner, the current average instruction execution speed can be caused to follow the target instruction execution speed.

In the seventh invention, even when the condition for further increasing the number of stages is satisfied in a control period subsequent to a control period in which the number of stages has been increased, the number of stages is not increased and the current number of stages is maintained if the control value or the deviation of the average value of the measured number of instructions executed per unit time from the target instruction execution number shows a tendency to increase. This means that when this condition is satisfied in a plurality of successive control periods after the number of stages is increased, the current number of stages is maintained. That is, the current average instruction execution speed tends to reach the target instruction execution speed sooner or later. Therefore, it is unnecessary to increase the number of stages immediately. This processing prevents a change to a class having a larger number of stages.

In contrast, even when the condition for further decreasing the number of stages is satisfied in a control period subsequent to a control period in which the number of stages has been decreased, the number of stages is not decreased and the current number of stages is maintained if the control value or the deviation of the average value of the measured number of instructions executed per unit time from the target instruction execution number shows a tendency to decrease. This means that when this condition is satisfied in a plurality of successive control periods after the number of stages is decreased, the current number of stages is maintained. That is, the current average instruction execution speed tends to reach the target instruction execution speed sooner or later. Therefore, it is unnecessary to decrease the number of stages immediately. This processing prevents a change to a class having a smaller number of stages.

By virtue of these processings, the number of stages is prevented from alternately changing between classes which do not continue. Although the power-saving effect increases as the number of stages decreases, the power-saving effect does not change linearly with the number of stages. The rate of change of the power-saving effect in relation to the number of stages increases as the number of stages increases. Accordingly, electrical power can be saved to the greatest extent when the numbers of stages of two adjacent classes which can realize the target instruction execution speed are selected, and the number of stages is alternately changed between the numbers of stages of the two classes. The present invention secures the accurate followability of the current average instruction execution speed to the target instruction execution speed, and can increase the probability of increasing the power-saving effect.

The eighth invention can increase the power-saving effect to the greatest extent, although the followability of the current average instruction execution speed to the target instruction execution speed tends to be lower than that in the seventh invention. The two adjacent classes which can realize the target instruction execution speed are the first class having a larger number of stages and the second class having a smaller number of stages. Since the current instruction execution speed at the number of stages of each class depends on a task, when the task is actually been executed, the first and second classes must be detected. In order to realize this, a first class group in which the control value or the deviation becomes negative and a second class group in which the control value or the deviation becomes positive are determined, and from the two groups, classes which are the closest in the number of stages are specified as the first class and the second class, respectively.

In the stage number control corresponding to the control value, the number of stages is alternately changed only between the number of stages of the first class and the number of stages of the second class. Thus, the current average instruction execution speed can be caused to follow the target instruction execution speed. In addition, since the numbers of stages of two adjacent classes are selected, the maximum power-saving effect can be achieved. Notably, the relation between the target instruction execution speed and the instruction execution speed at the number of stages of each class changes, according to the present invention, two classes at which two closest instruction execution speeds sandwiching the current target instruction execution speed can be obtained are selected real time. Therefore, the current average instruction execution speed can be caused to follow the target instruction execution speed, while the maximum power-saving effect is achieved at all times.

The ninth invention is identical with the eighth invention in terms of the detection of the first class and the second class. The ninth invention does not restrict the number of stage to the number of stages of the first class and the number of stages of the second class as in the eighth invention. When the first class having a larger number of stages is selected in a certain control period, the control value is corrected so as to increase the probability at which the number of stages of the second number having a smaller number of stages is selected in the next control period. This control decreases the probability at which the number of stages changes from the number of stages of the first class to the number of stages of a class having a larger number of classes. Thus, when the current average instruction execution speed is lower than the target instruction execution speed, the current average instruction execution speed can follow the target instruction execution speed only at the number of stages of the first class. Thus, the number of stages is prevented from being changed beyond the adjacent class, whereby the power-saving effect is enhanced.

In the tenth invention, the number of stages is changed to the maximum number of stages, the intermediate number of stages, and the minimum number of stages; and the intermediate number of stages is preferentially selected at all times. Thus, when the target instruction execution speed is present between the instruction execution speed at the maximum number of stages and the instruction execution speed at the intermediate number of stages, the probability at which the number of stages is changed only between the maximum number of stages and the intermediate number of stages can be increased. Further, when the target instruction execution speed is present between the instruction execution speed at the intermediate number of stages and the instruction execution speed at the minimum number of stages, the probability at which the number of stages is changed only between the intermediate number of stages and the minimum number of stages can be increased. These controls maximize the power-saving effect when the number of stages of the pipeline is changed among the maximum number of stages, the intermediate number of stages, and the minimum number of stages.

In the eleventh and twelfth inventions, since supply voltage control means for controlling the supply voltage in accordance with the number of stages and the clock frequency is provided, the power consumption can be reduced further.

In the thirteenth invention, when the stages are unified in the PSU scheme and in the DVS scheme, the supply voltage and the frequency are continuously controlled in accordance with the control value. Therefore, power consumption can be reduced further.

Circuit diagram showing a portion of a pipeline for describing operation of an embodiment of the present invention.

[FIG. 2]

Circuit diagram of a control apparatus of the pipeline according to the embodiment of the present invention.

[FIG. 3]

Configurational diagram showing a stage number controller according to the embodiment of the present invention.

[FIG. 4]

Flowchart showing processing steps of a stage number controller according to Embodiment 1 of the present invention.

[FIG. 5]

Flowchart showing processing steps of a stage number controller according to Embodiment 3 of the present invention.

Figure 6:
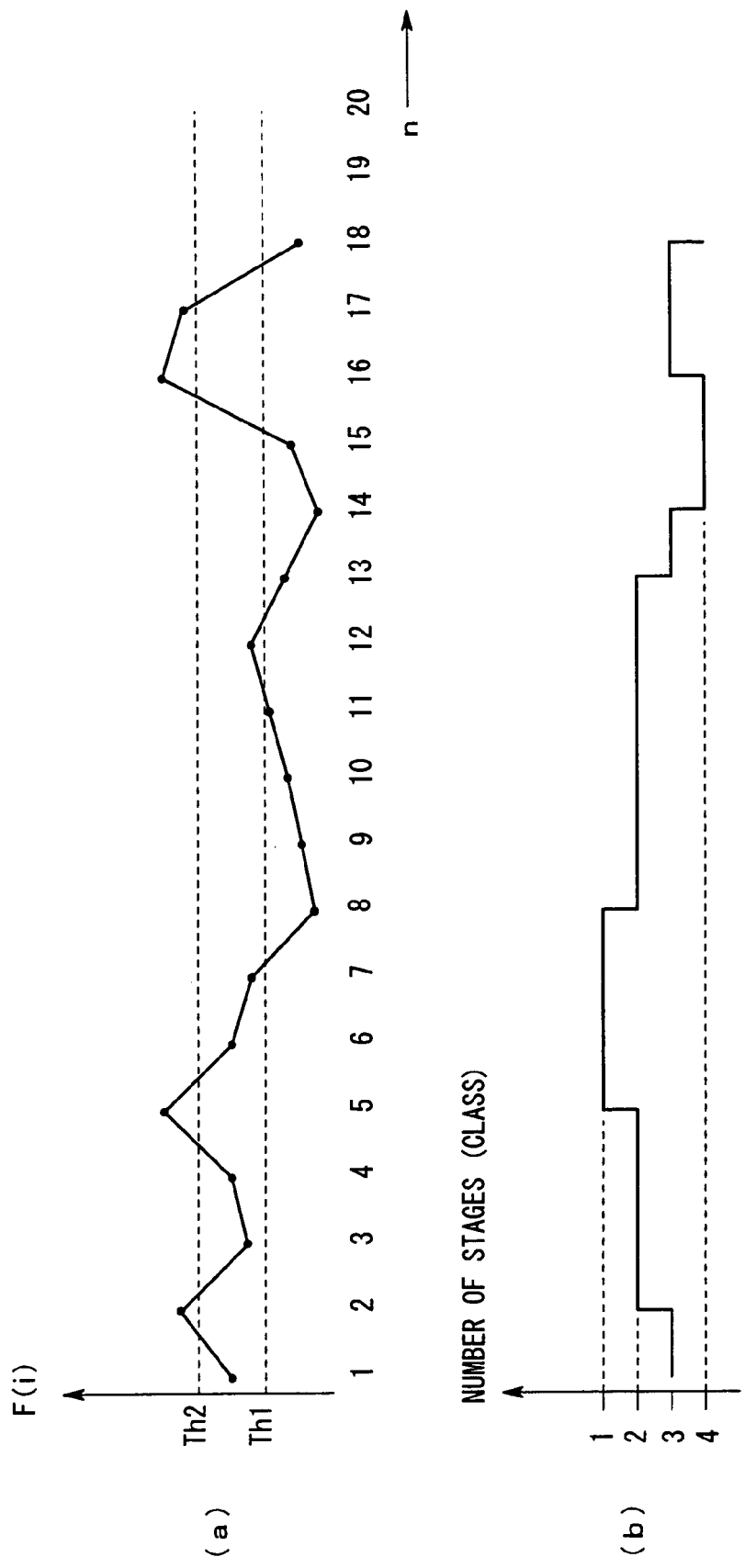

[FIG. 6]
Timing chart showing changes in a control value and the number of stages which are changed by the stage number controller according to Embodiment 3 of the present invention.

Figure 7:
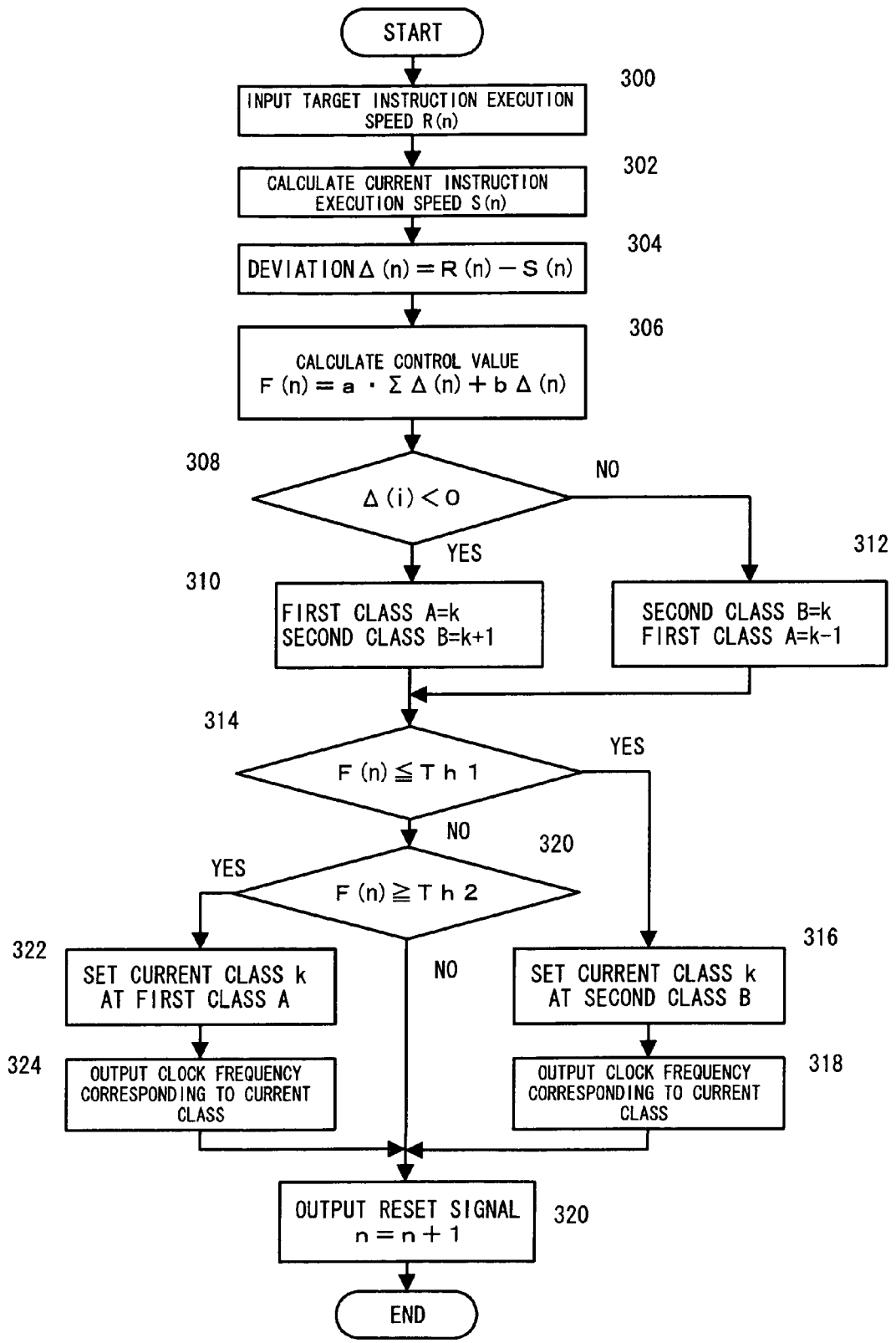

[FIG. 7]
Flowchart showing processing steps of a stage number controller according to Embodiment 4 of the present invention.

Figure 8:
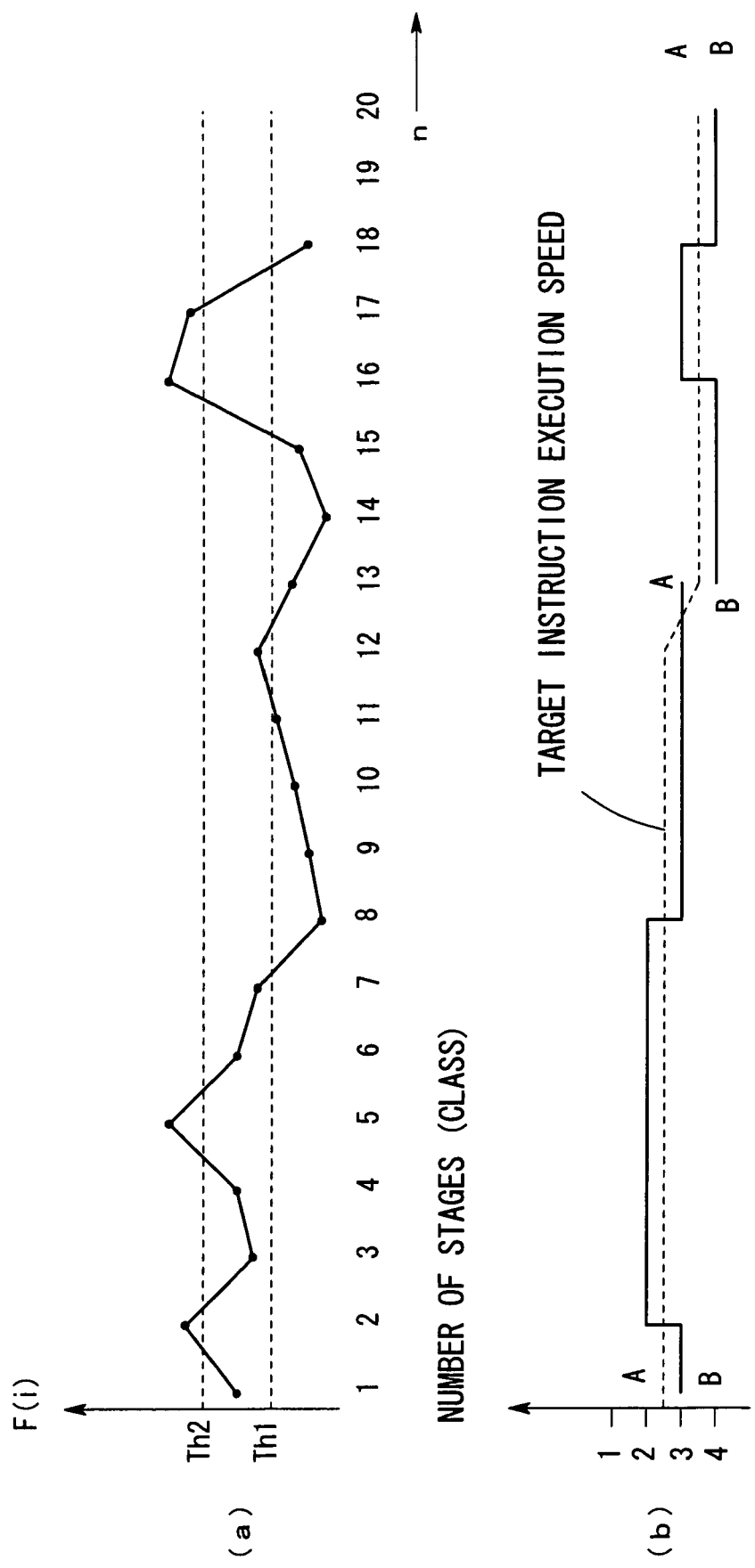

[FIG. 8]
Timing chart showing changes in a control value and the number of stages which are changed by the stage number controller according to Embodiment 4 of the present invention.

Figure 9:
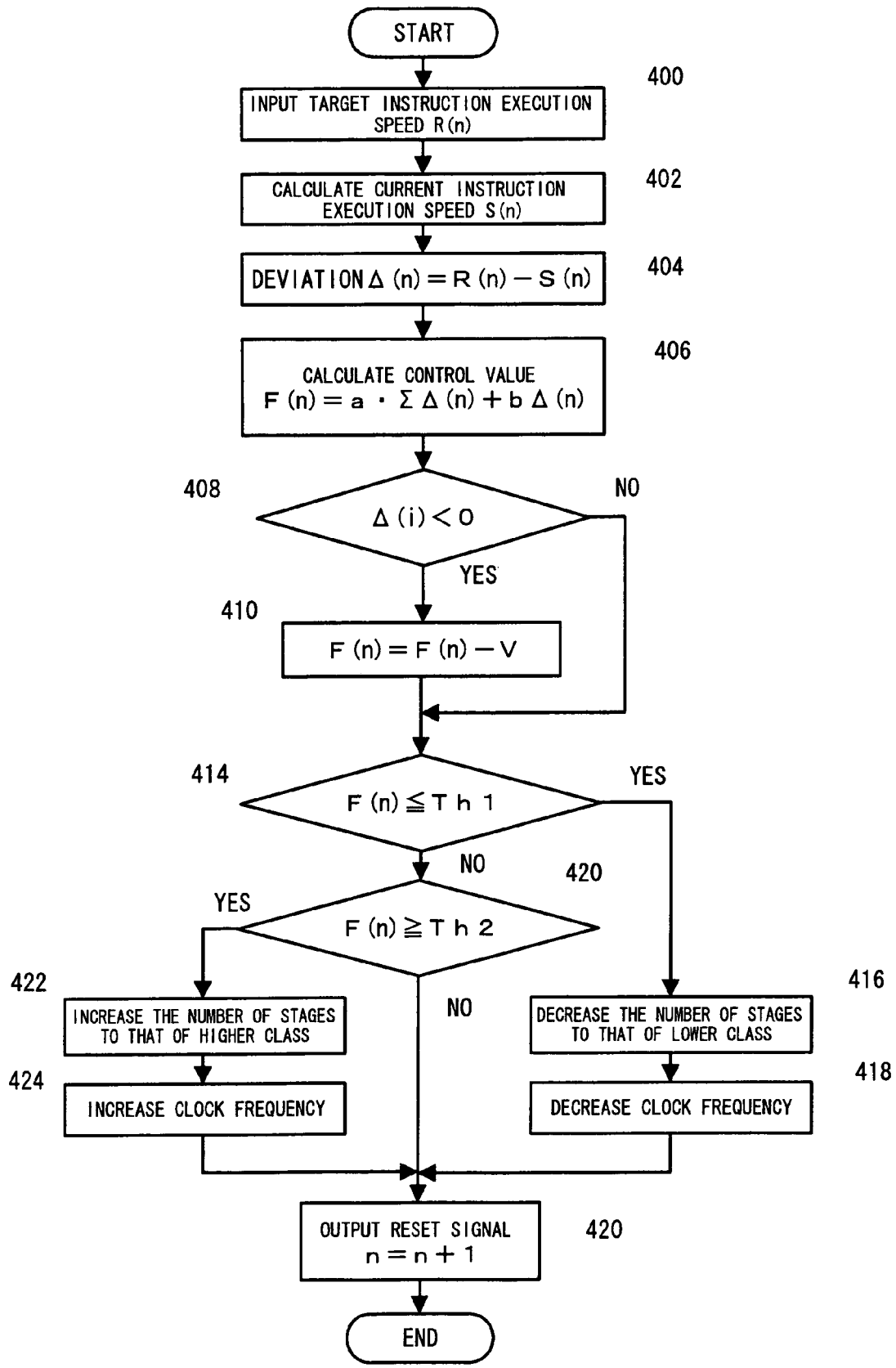

[FIG. 9]
Flowchart showing processing steps of a stage number controller according to Embodiment 5 of the present invention.

Figure 10:
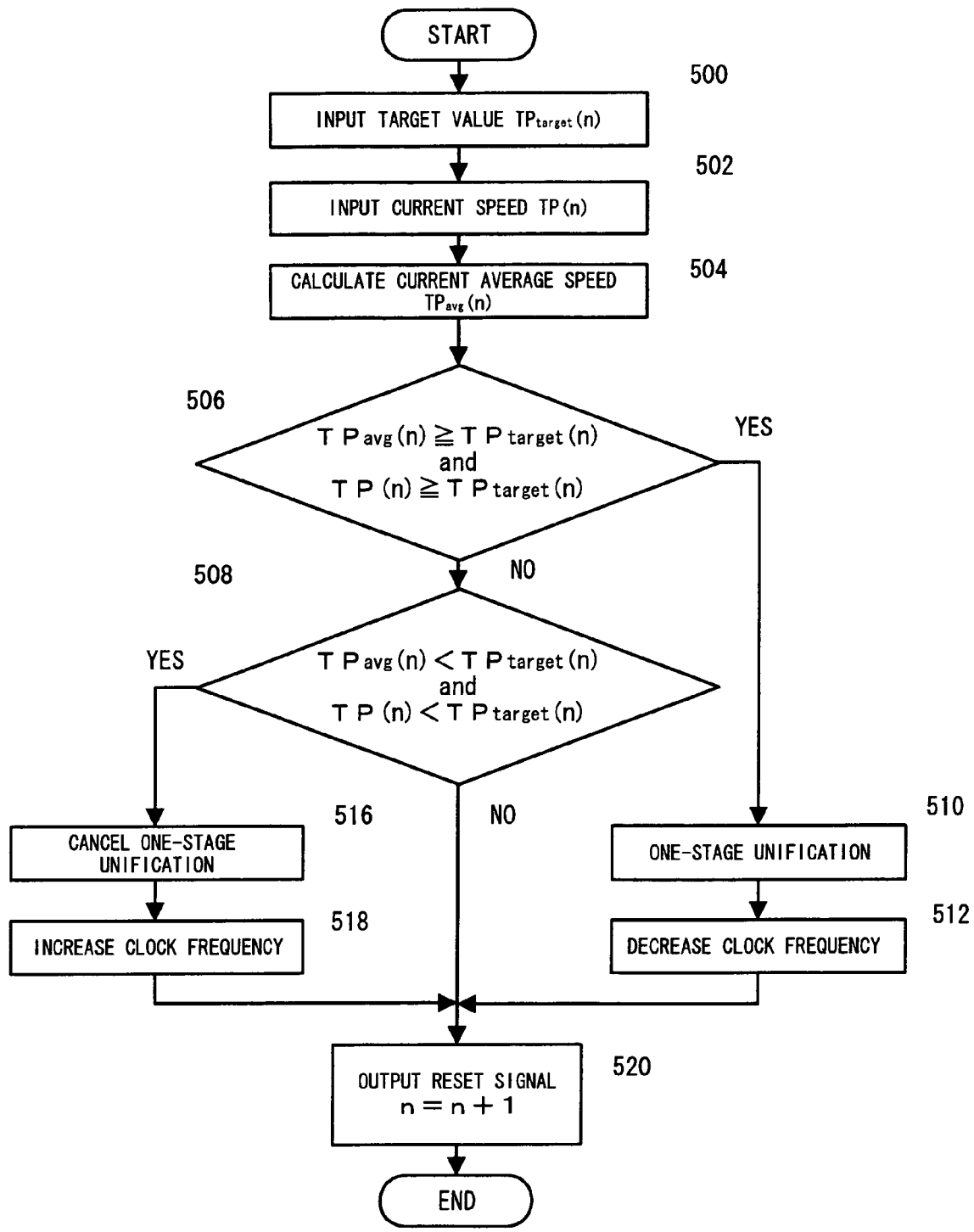

[FIG. 10]
Flowchart showing processing steps of a stage number controller according to Embodiment 6 of the present invention.

Figure 11:
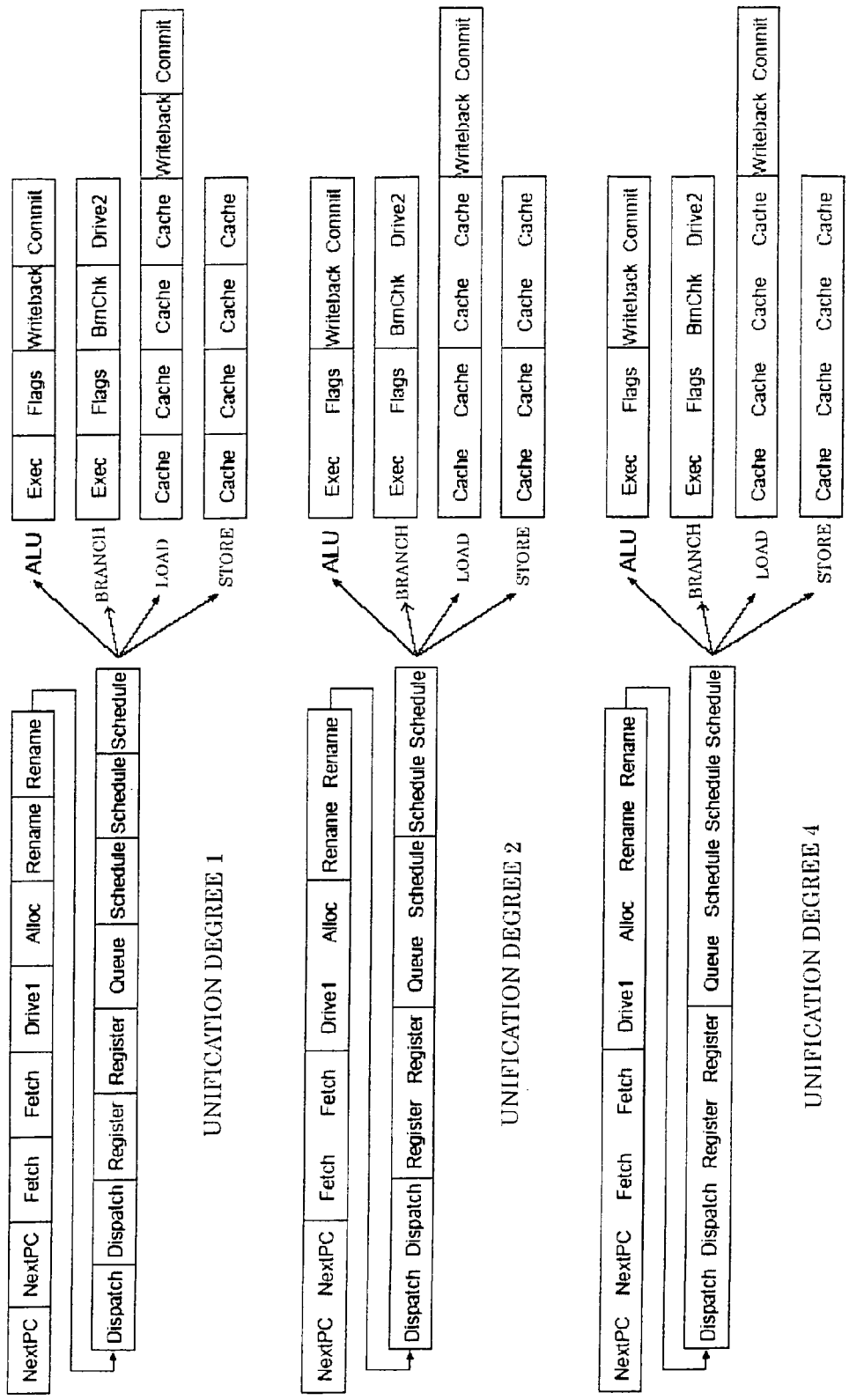

[FIG. 11]
Configurational diagram showing the pipeline of an assumed PSU according to Embodiment 6 of the present invention.

Figure 12:
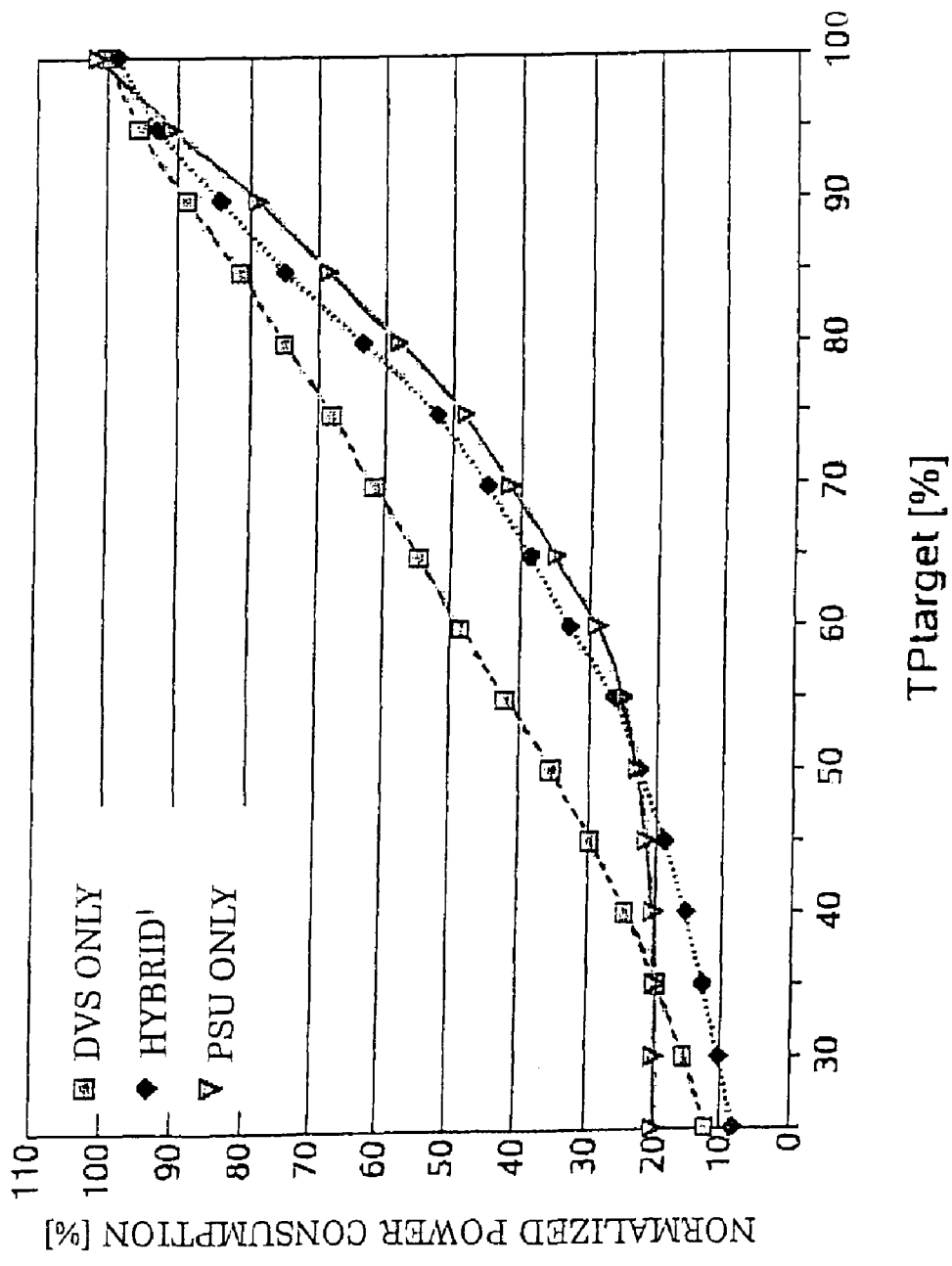

[FIG. 12]
Characteristic chart showing power consumption in a case where the stage number control of Embodiment 6 of the present invention is performed, for comparison with DVS.

Figure 13:
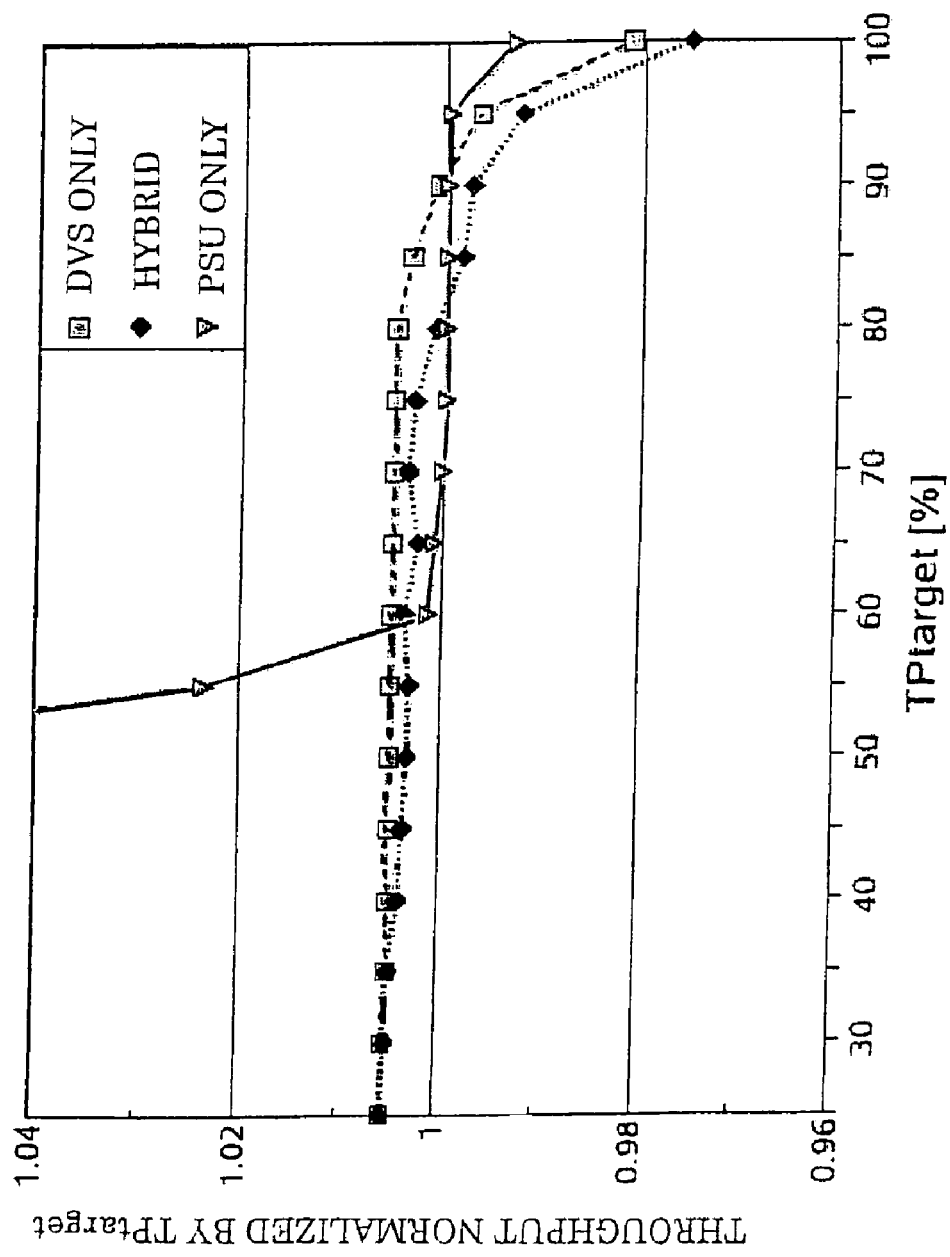

[FIG. 13]
Characteristic chart showing throughput in a case where the stage number control of Embodiment 6 of the present invention is performed, for comparison with DVS.

Figure 14:
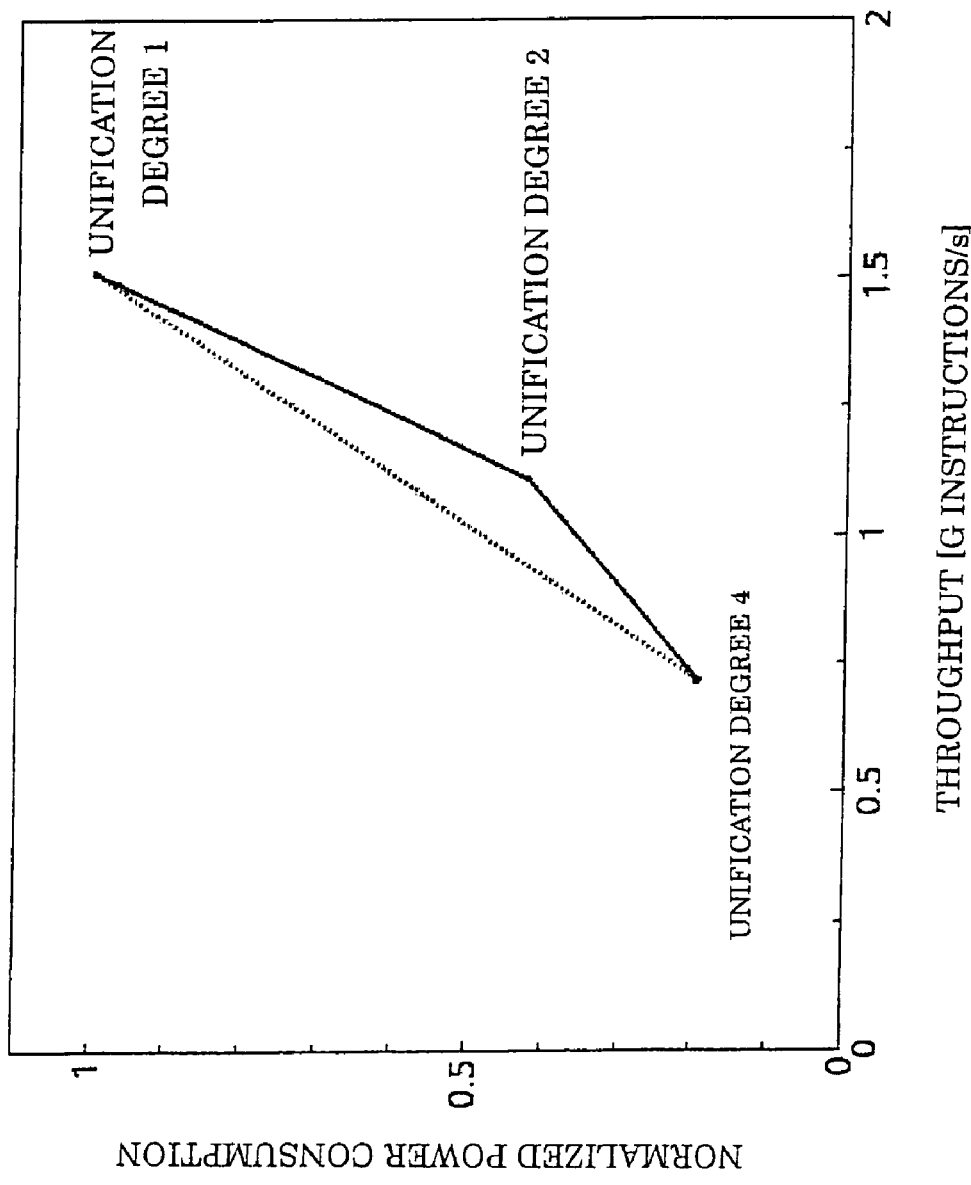

[FIG. 14]
Characteristic chart showing that the power-saving effect is enhanced by the stage number controls of Embodiment 3, 4, 5, and 7.

Figure 15:
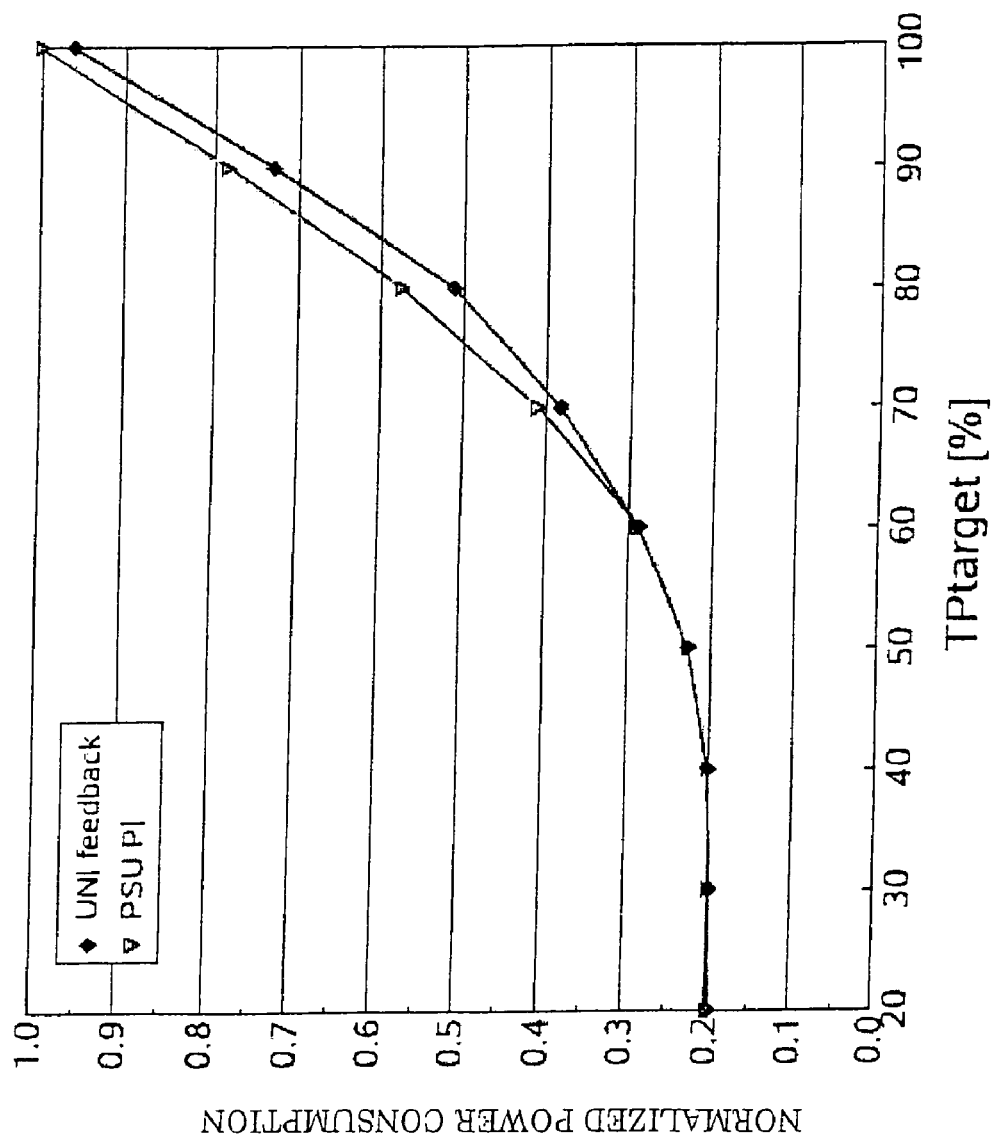

[FIG. 15]
Characteristic chart showing power consumption in a case where the stage number control of Embodiment 7 of the present invention is performed, for comparison with that in a case where the stage number control of Embodiment 6 of the present invention is performed.

Figure 16:
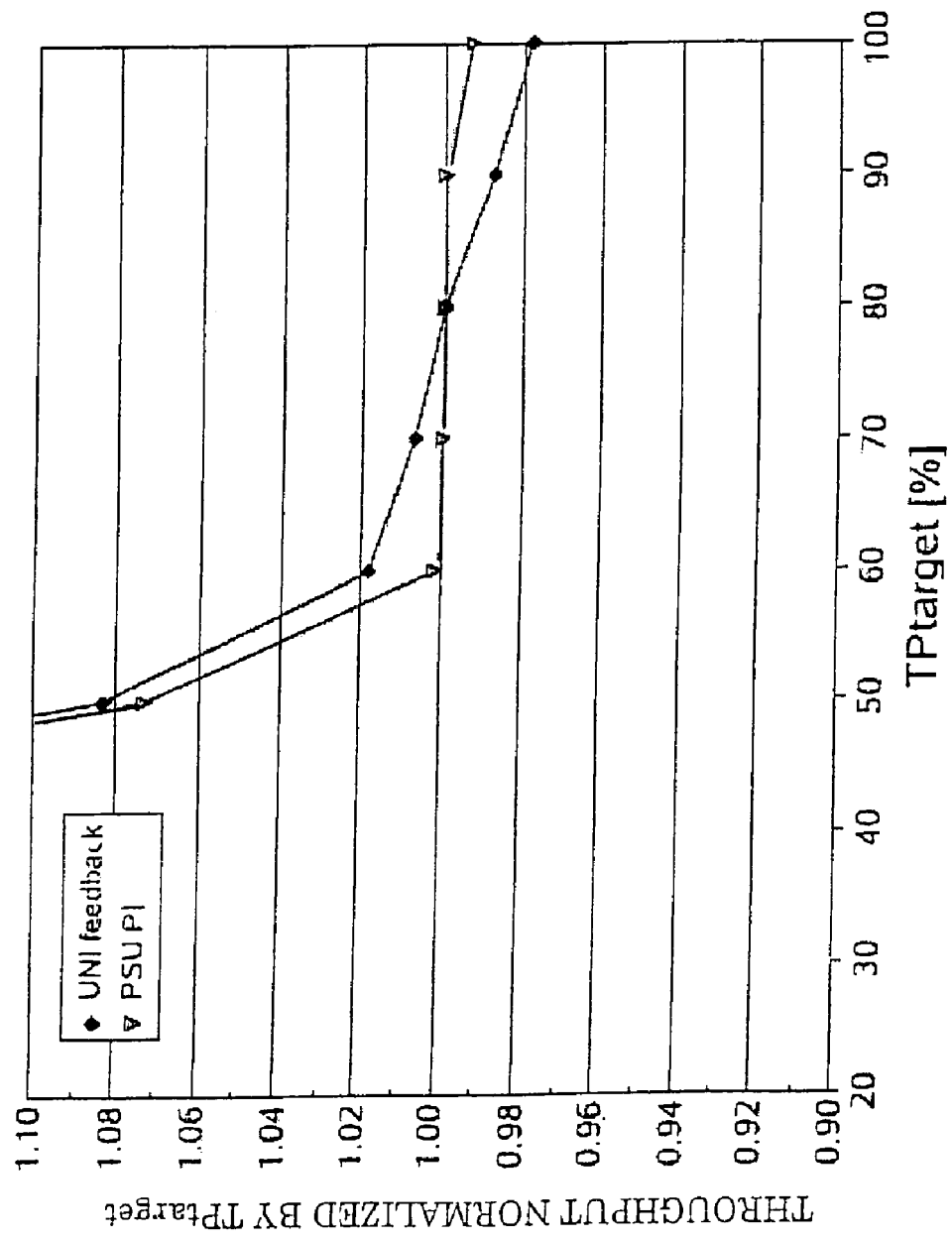

[FIG. 16]
Characteristic chart showing throughput in a case where the stage number control of Embodiment 7 of the present invention is performed, for comparison with that in a case where the stage number control of Embodiment 6 of the present invention is performed.

Figure 17:
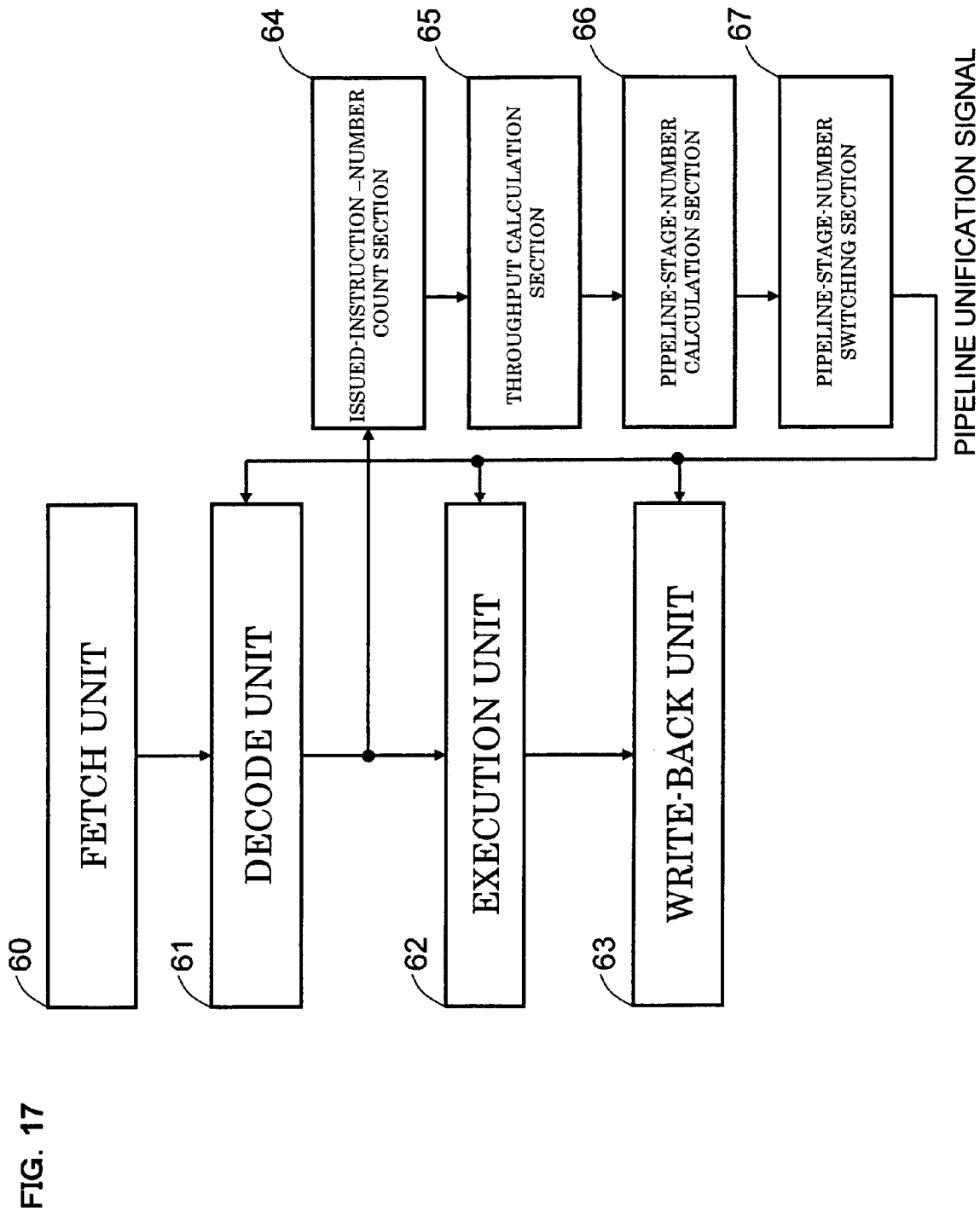

[FIG. 17]
Block diagram showing the configuration of Embodiment 8 in which the stage number controller of the present invention is realized by a logic circuit.

Figure 18:
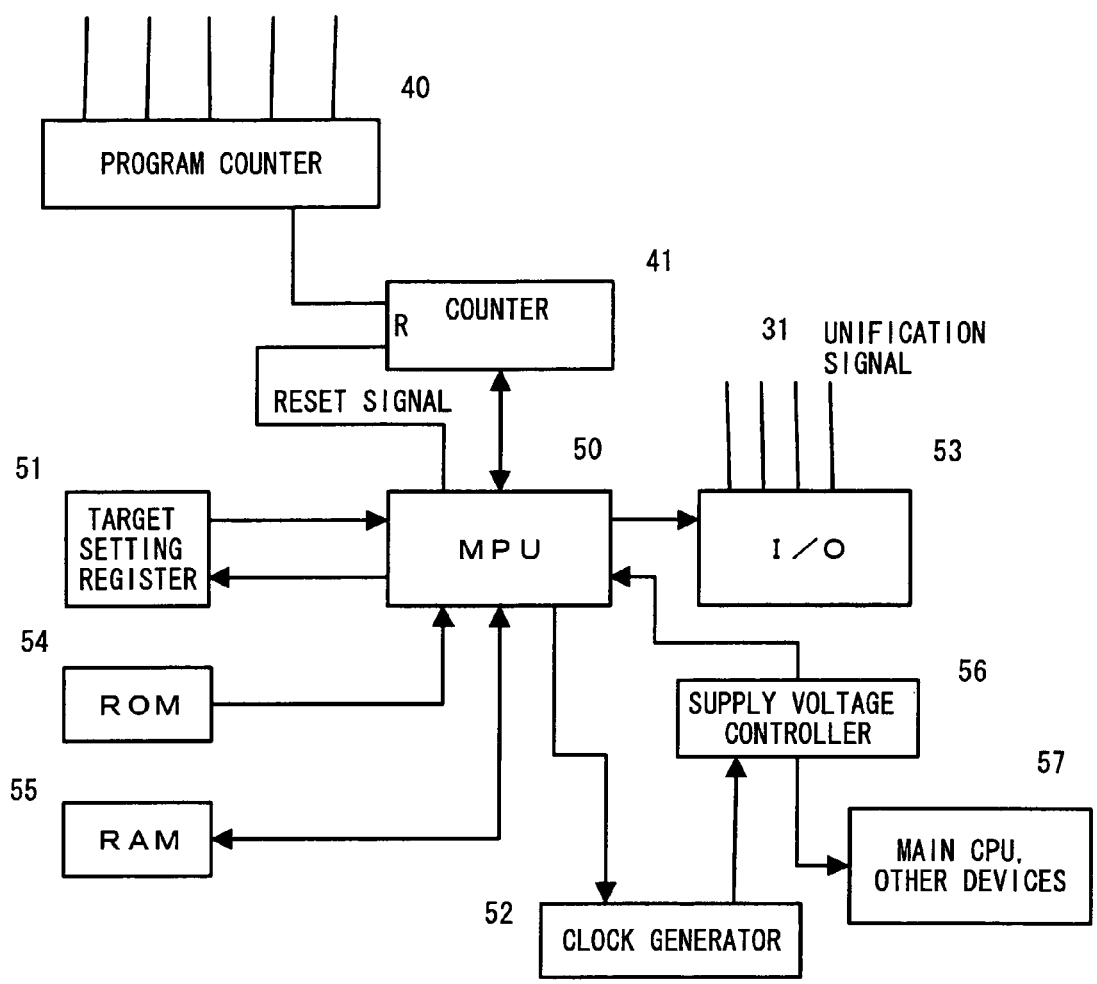

[FIG. 18]
Configurational diagram of a stage number controller according to Embodiment 9 of the present invention.

Figure 19:
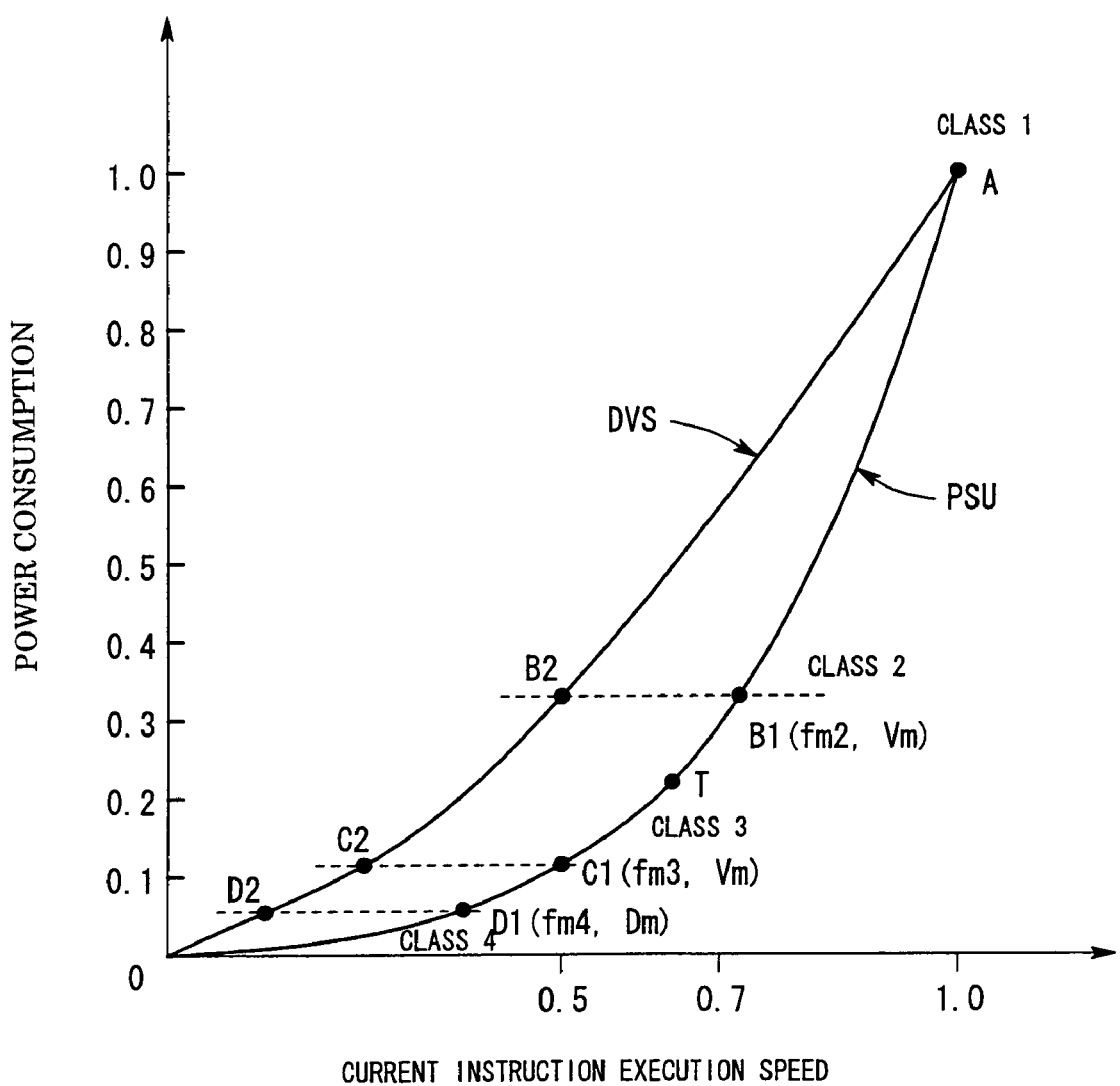

[FIG. 19]
Characteristic chart showing the control scheme of the stage number controller according to Embodiment 9.

DESCRIPTION OF REFERENCE NUMERAL 101-117: pipeline register
201-217: clock driver
302-316: AND gate
30: clock signal line
31: unification signal line
40: program counter
41: counter
51: target setting register

BEST MODE FOR CARRYING OUT THE INVENTION

The present invention will now be described by reference to embodiments. The present invention is not limited to the following embodiments.

Embodiment 1

Outline of PSU

Figure 1:
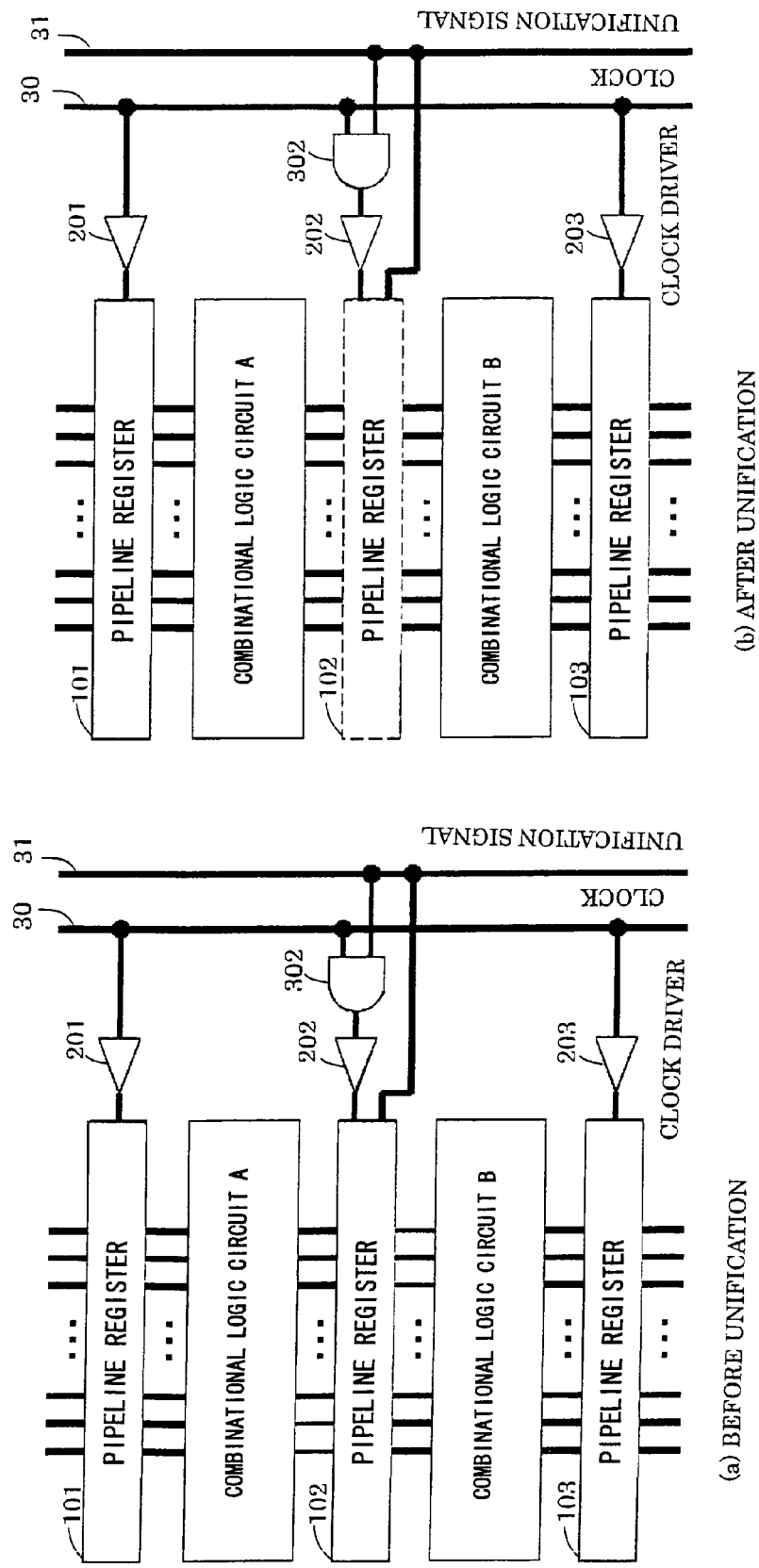
[FIG. 1]
Figure 2:
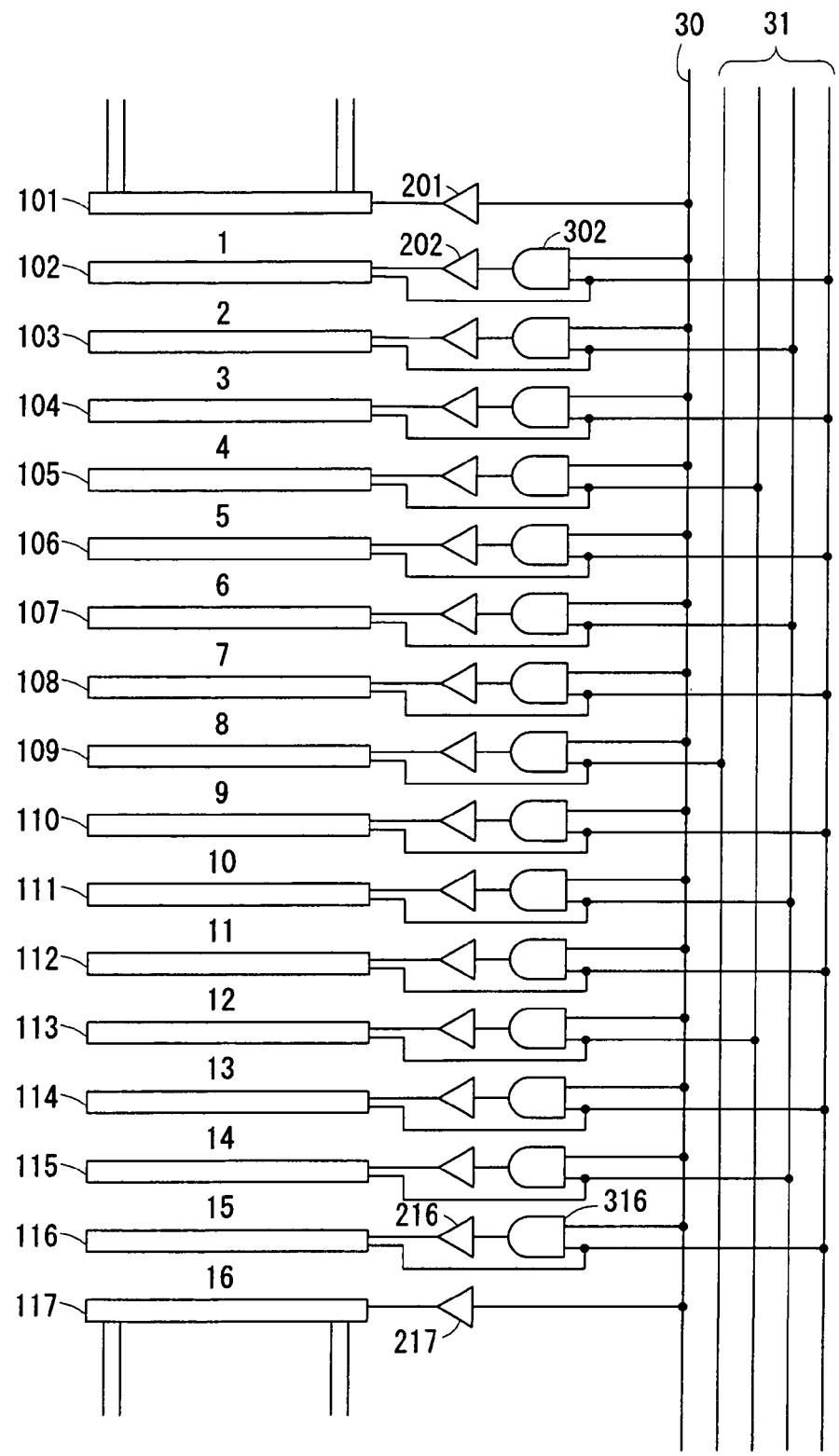

FIG. 1 and FIG. 2 show connection between pipeline registers and signal lines associated with PSU. FIG. 2 shows a 16-stage pipeline, and FIG. 1 is a detailed view of a portion thereof. As shown in FIG. 2, 17 pipeline registers 101-117 are provided, and 16 combinational logic circuits 1 to 16 are provided between these registers. The pipeline registers 101-117 receive outputs of 17 clock drivers 201-217 at the final stage of a hierarchical clock network. A clock signal from a clock signal line 30 is input to the clock drivers 201-217. Further, as signal lines for PSU, there is provided a unification signal line 31, which transmits a 4-bit unification signal (stop signal) which instructs unification; i.e., stoppage of operation of pipeline registers. In FIG. 1, a first-stage combinational logic circuit A is disposed between the pipeline register 101 and the pipeline register 102, and a second-stage combinational logic circuit B is disposed between the pipeline register 102 and the pipeline register 103. As shown in FIG. 2, the combinational logic circuits 1-16 of respective stages are provided between adjacent pipeline registers. The number of the logic circuits between the pipeline registers each having a signal latch function is referred to as the number of stages.

A unification signal (1111) on the 4-bit unification signal line instructs a state in which all the 16 stages are used, and unification is not performed. A unification signal (1110) with only one bit being at L level instructs to alternately unify the stages (i.e., unify the first and second stages, the third and fourth stages, etc.) to thereby unify the 16 stages into 8 stages. A unification signal (1100) with two bits being at L level instructs to alternately unify the 8 stages (combinational logic circuits) into 4 stages. A unification signal (1000) with three bits being at L level instructs to unify the 4 stages into 2 stages. Further, a unification signal (0000) with all the four bits being at L level instructs to unify the 2 stages into a single stage so that the 16 stages are unified into a single stage.

The clock drivers 201-217 are connected to the pipeline registers 101-117. AND gates 302-316 are connected to 15 clock drivers 202-216 of the clock driver 201-217. The AND gates 302-316 are connected to the 4-bit unification signal line 31 so as to receive unification signals therefrom such that the currently available stages are alternately unified stepwise as described above. Each AND gate which has received an L-level signal of the above-described unification signal does not output the clock to the corresponding clock driver. Each clock driver is configured such that when the clock signal is not input thereto, current is cut off so as to stop its amplification operation. Further, the unification signal input to the AND gates is also input to the pipeline registers. Each pipeline register is configured such that when an L-level unification signal is input thereto, the pipeline register does not perform latching operation and passes signals from the upstream combinational logic circuit to the downstream combinational logic circuit. Each pipeline register is configured such that power consumption becomes extremely small in such a state.

FIG. 1(a) shows a state in which the stages are not unified; i.e., the number of stages is the maximum. FIG. 1(b) shows a state in which adjacent combinational logic circuits are unified into the stage number of a one-class-lower class. The pipeline registers 101 and 103 shown by solid-line blocks in the drawing latch signals from the upstream side, and the pipeline register 102 shown by a broken-line block passes the signals to the downstream side without latching them. The other pipeline registers shown in FIG. 2 operate in a similar manner, and alternate pipeline registers perform through-operations without latching signals from the upstream side. This is a pipeline subjected to one-stage unification processing. When the adjacent combinational logic circuits are unified alternately in this state, the unified state of a two-class-lower class is created. Unification for a three-class-lower class and a four-class-lower class is performed in a similar manner.

In the state shown in FIG. 1(a), the pipeline operates as an ordinary pipeline. The adjacent combinational logic circuits A and B operate as different stages, because the pipeline registers 101-103 between the circuits operate. Meanwhile, in the state shown in FIG. 1(b), the unification signal is set to 1110 so as to stop supply of clocks to the pipeline register 102 between the combinational logic circuits A and B, so that the signals are passed through the pipeline register 102. Accordingly, this pipeline register 102 does not operate, and the two combinational logic circuits A and B operate as a single stage. The remaining pipeline registers operate in a similar manner.

Apparatus for Stage Number Control

Figure 3:
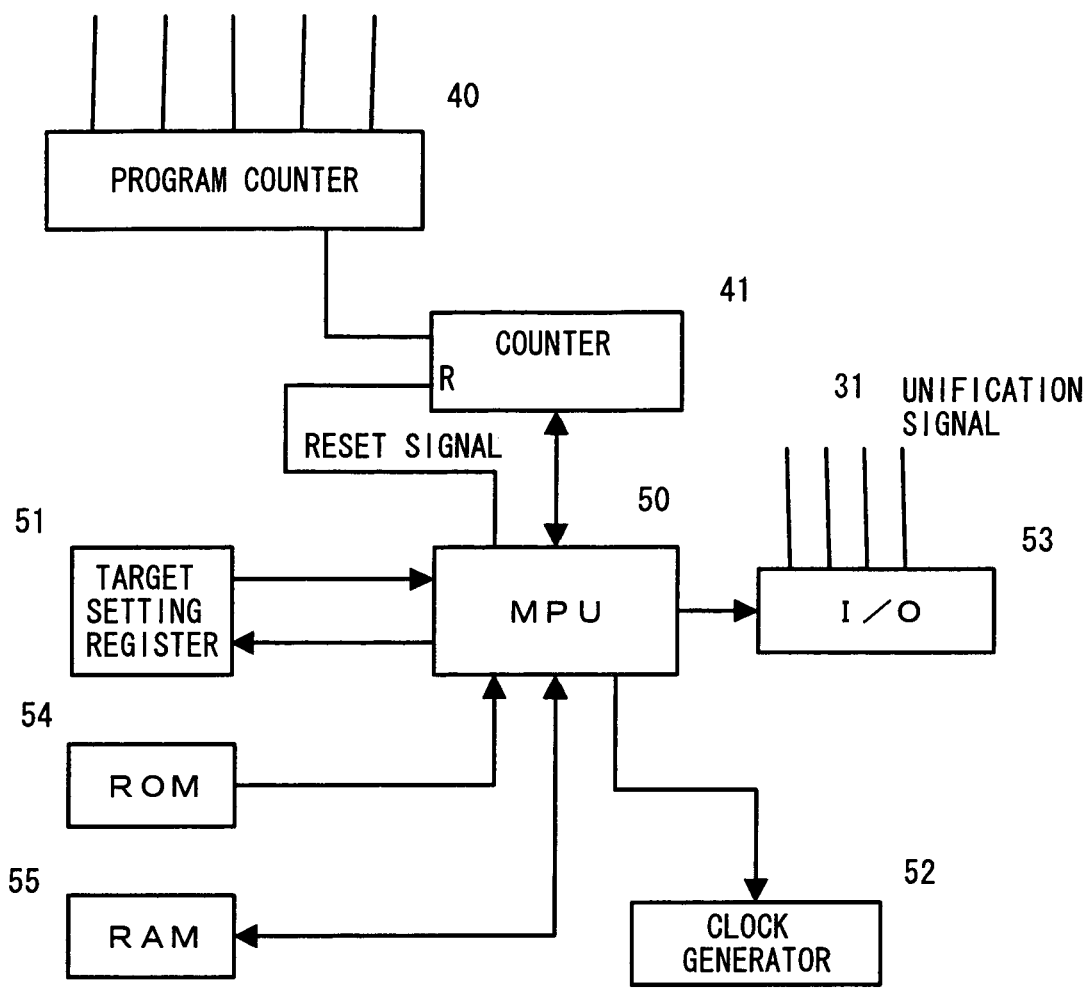

In the present embodiment, a stage number controller shown in FIG. 3 is incorporated into an ordinary main microprocessor as a circuit pattern. A counter 41 measures the number of updates of a program counter 40 of the microprocessor. The program counter shows the memory address of an instruction word currently decoded. Accordingly, every time the program counter is updated, an instruction word is read out. A signal indicating update of data of the program counter is input to the counter 41. Thus, the counter 41 can measure the number of instruction words executed. The present stage number controller includes an MPU 50 for stage number control. The MPU 50 outputs a reset signal to the counter 41 and reads the value of the counter after the reset, whereby the number of instruction words executed in a period elapsed after the reset can be measured. For example, in a case where the MPU 50 provides a reset signal to the counter 41 at intervals of 100 ms, the actual number of instruction words executed in each 100 ms period can be measured. Notably, in the present embodiment, the stage number of the pipeline is also controlled at intervals of 100 ms.

Further, there is provided a target setting register 51 for setting a target number of instructions to be performed per unit time (target instruction execution speed). This target setting register 51 is set by the main microprocessor. For example, in a case where a user designates a power saving mode, the target instruction execution speed is set by the main microprocessor in accordance with the level of the power saving mode. Further, when the main microprocessor executes a certain task, it is possible to obtain a time which can be used for processing of the task, and to set the target instruction execution speed in accordance with that time. Further, in a case where various application programs and input output/communication control programs are performed successively or undergo parallel processing real time, it is possible to obtain, for each application program or input output/communication control program, a permissible time required to complete a requested task, and to set a target instruction execution speed corresponding to the required time to the target setting register 51. This setting is preferably performed in an application program.

Further, a clock generator 52 is provided. The MPU 50 submits an instruction to the clock generator 52 so as to cause the clock generator 52 to generate clocks at a frequency corresponding to the number of stages obtained through calculation. Moreover, the MPU 50 is configured to output a 4-bit unification signal to the unification signal line 31 via an input output interface 53. In addition, there are provided ROM 54 which stores a processing program to be executed by the MPU 50, and RAM 55 which temporarily stores data.

Figure 4:
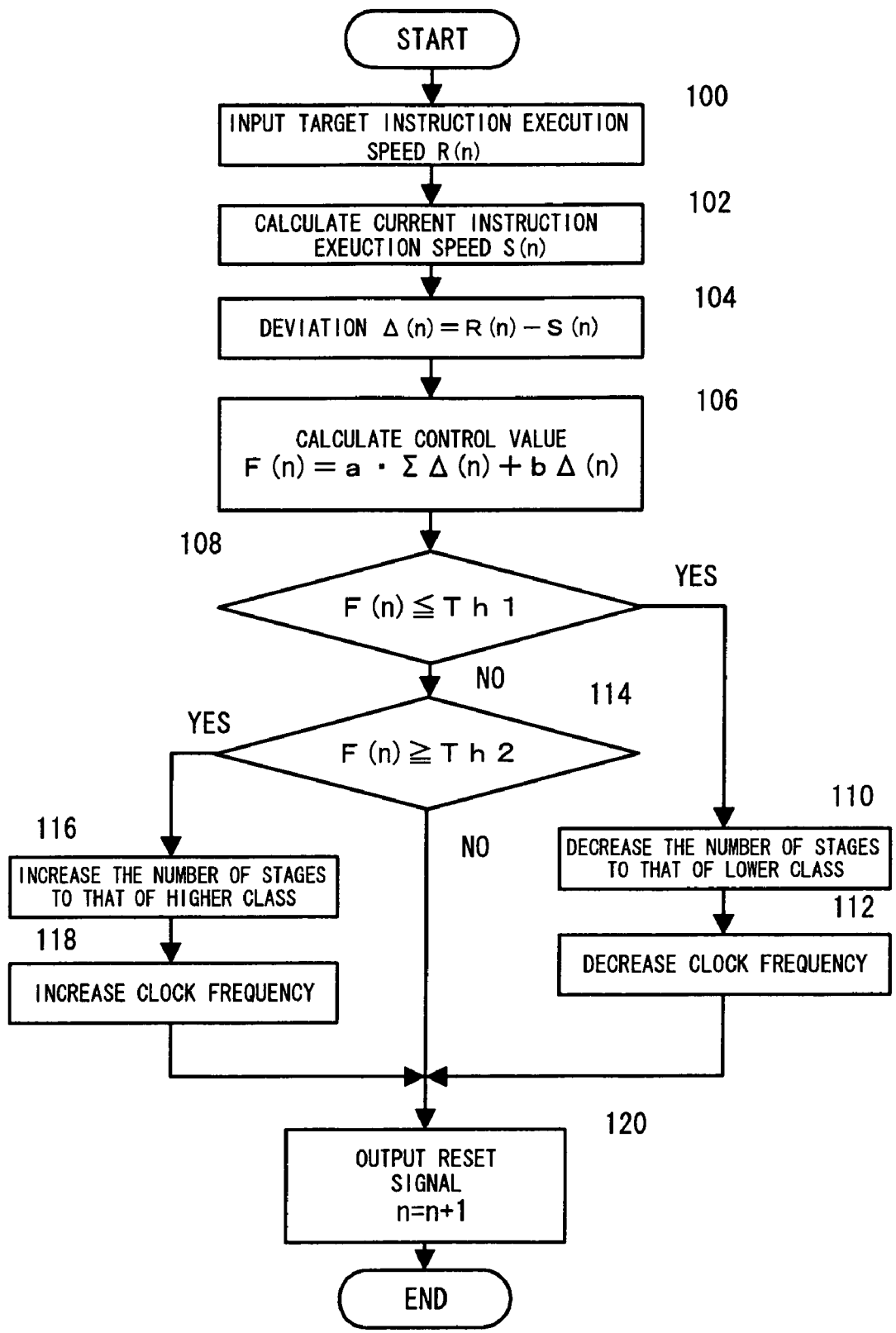

Next, the processing steps of the MPU 50 will be described. The program of FIG. 4 is intermittently executed in control periods of 100 ms intervals. The MPU 50 is configured to enter a power-saving mode in periods other than the intermittent executing periods. Therefore, even when the MPU 50 is added, power consumption does not increase. In step 100, a target instruction execution speed R(i) is read from the target setting register 51. In step 102, a current instruction execution speed S(n) is calculated on the basis of the value of the counter 41. Since the counter 41 is reset in each of the control periods of 100 ms intervals, and the value of the counter 41 after elapse of 100 ms is read out, the number of instructions executed in the 100 ms period can be obtained, and the current instruction execution speed S(n) (per 1 s) in the current control period n is calculated therefrom. n is a control period variable representing control periods for which stage number control is performed at intervals of 100 ms.

Next, in step 104, a deviation $\Delta(n)$ is calculated by an equation R(n)−S(n). Subsequently, in step 106, a control value F(n) is calculated by an equation $a\Sigma\Delta(n)+b\Delta(n)$. That is, integral-proportional calculation is performed. a and b are gains of the respective terms.

Next, in step 108, a determination is made as to whether or not the control value F(n) is equal to or less than a first threshold Th1. When the control value F(n) is equal to or less than the first threshold Th1, in step 110, a signal for lowering the number of stages to the number of a one-class-lower class is output. The number of stages can be set to the number of a one-class-lower class by making the unification signal zero from the least significant bit. That is, 4-bit data are shifted toward the most significant digit by one bit such that the least significant digit becomes 0. Further, in accordance with the number of stages, in step 112, the clock frequency is lowered to half the current frequency.

When in step 108 the control value F(n) is determined to be greater than the first threshold Th1, in step 114, a determination is made as to whether or not the control value F(n) is equal to or greater than a second threshold Th2. When the control value F(n) is equal to or greater than the second threshold Th2, in step 116, a signal for increasing the number of stages to the number of a one-class-higher class. The number of stages can be set to the number of a one-class-higher class by making the unification signal 1 from the most significant bit. That is, 4-bit data are shifted toward the least significant digit by one bit such that the most significant digit becomes 1. Further, in accordance with the number of stages, in step 118, the clock frequency is increased to double the current frequency. When a No determination is made in step 114; i.e., when the control value F(n) is present between the first threshold Th1 and the second threshold Th2, the number of stages is not changed, and in step 120, a reset signal is output to the counter 41 and the control period variable n is incremented by 1 so as to count the number of instructions executed in the next control period.

Through repeated execution of the above-described processing, feedback control of the number of stages is performed such that the control value F(n) becomes 0. The number of stages is controlled such that the current average instruction execution speed follows the target instruction execution speed. When the target instruction execution speed is constant, even when the current instruction execution speed changes depending on the type of task, the current average instruction execution speed is controlled to become equal to the target instruction execution speed through changing of the number of stages. Further, even when the current instruction execution speed does not change, in order to attain the target instruction execution speed, the number of stages is alternately switched or controlled between the numbers of stages of first and second classes, at which speeds sandwiching the target speed are attained, whereby the current instruction execution speed is controlled to become equal to the target instruction execution speed.

Embodiment 2

In Embodiment 1, in a case where, after the condition of step 108 of FIG. 4 is satisfied in a certain control period (n) and the number of stages is lowered to the number of a one-class-lower class, the condition of step 108 is again satisfied in the next control period (n+1), the number of stages is again lowered to the number of a one-class-lower class in step 110. That is, the number of stages is reduced successively. In this case, the power-saving effect lowers. In order to overcome this problem, in the present embodiment, in step 106 of the processing of FIG. 4, a differential term $c(\Delta(n)-\Delta(n-1))$ is added to the control value F(n). Even when a Yes determination is made in step 108 of Embodiment 1, if the deviation shows a tendency to increase, the differential term becomes positive, whereby the control value is increased. That is, this prevents the number of stages from decreasing. In other words, since it is found in the present control period (n) that the current instruction execution speed shows a tendency to decrease in the future, in relation to the target instruction execution speed, the number of stages is prevented from decreasing in the current control period. Thus, unnecessary changes in the number of stages can be prevented. Meanwhile, if the current instruction execution speed shows a tendency to increase in the future, in relation to the target instruction execution speed, the control value F(n) is decreased further so as to decrease the number of stages early. In this manner, the followability to the target instruction execution speed is improved, and the power-saving effect can be enhanced. The stage number controller operates in a similar way when the number of stages is increased.

Embodiment 3

Figure 5:
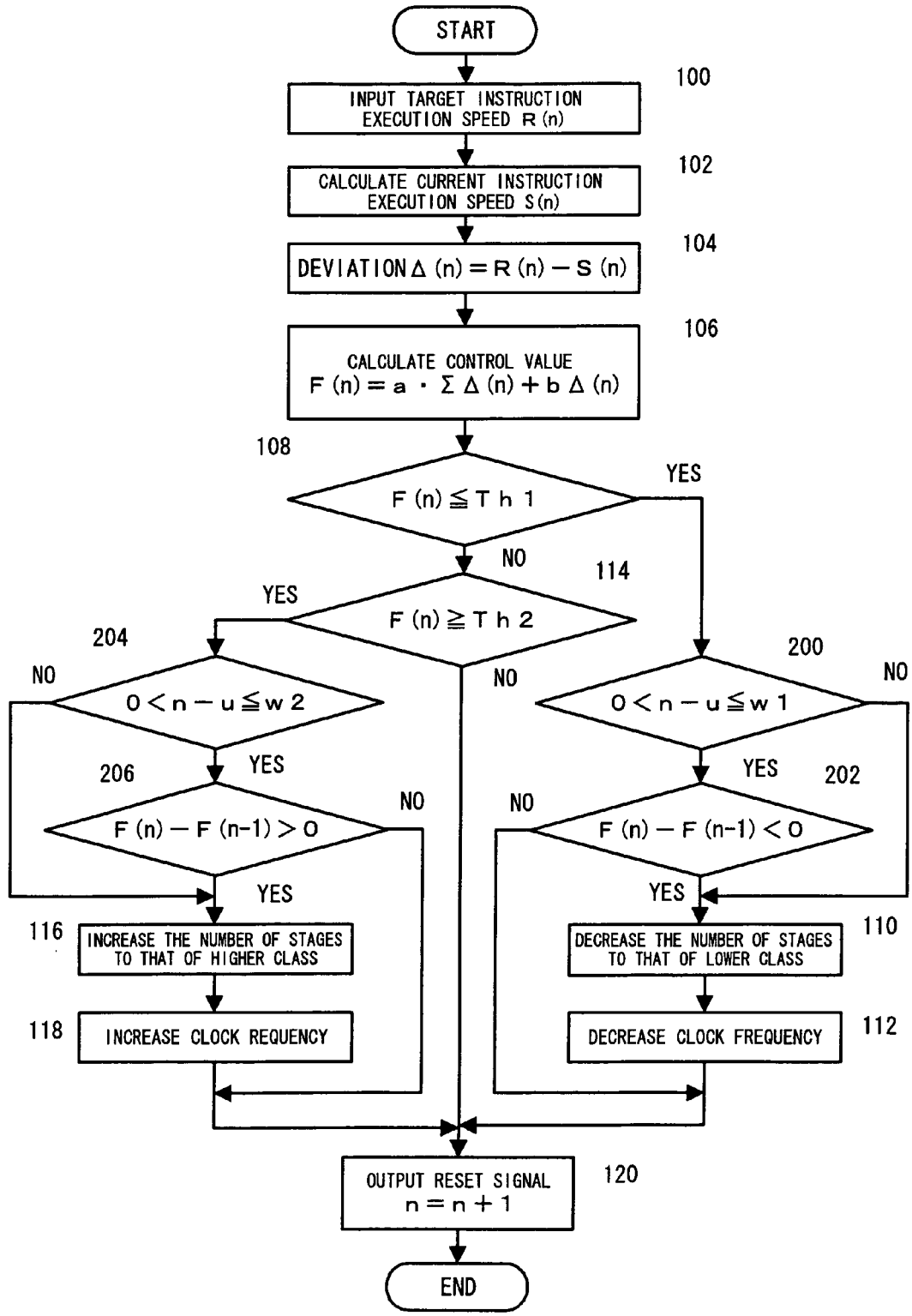

The present embodiment is configured to prevent the number of stages from continuously decreasing or increasing in successive control periods. Steps 100-106 are the same as those of the program shown in FIG. 4 of Embodiment 1. When in step 108 of FIG. 5 the control value F(n) is determined to be equal to or less than the first threshold Th1, in step 200, a determination is made as to whether or not the difference between the current control variable n and a control variable u at the time when the number of stages has decreased recently without being increased thereafter (i.e., the number of control periods which have elapsed after the number of stages had been decreased recently and in which the number of stages did not change) is positive and equal to or less than a predetermined number w1.

When the determination result is Yes, in step 202, a determination is made as to whether or not the current control value F(n) shows a tendency to decrease (i.e., (F(n)−F(n−1))<0). In a case where the current control value F(n) shows a tendency to decrease, even when the number of stages is decreased, the current average instruction execution speed still shows a tendency to increase in relation to the target instruction execution speed. Therefore, only in this case, in steps 110 and 112, processing for decreasing the number of stages to the number of stages of a one-class-lower class is performed. In a case where the current control value F(n) does not show a tendency to decrease, even when the number of stages is not decreased further, the control value F(n) is expected to become greater than the first threshold Th1 in a control period of the near future. Therefore, in this case, the processing for decreasing the number of stages is not executed.

Meanwhile, in a case where the current control value F(n) is still equal to or less than the first threshold Th1 even after a predetermined number of control periods have elapsed after the number of stages had decreased to the number of a one-class-lower class (i.e., when a Yes determination is made in step 108 and a No determination is made in step 200), it means that the current average instruction execution speed is greater than the target instruction execution speed. Therefore, the processing for decreasing the number of stages to the number of stages of a one-class-lower class is performed for follow-up control.

Similarly, when the control value F(n) is determined in step 114 to be equal to or greater than the second threshold Th2, in step 204, a determination is made as to whether or not the difference between the current control variable n and a control variable u at the time when the number of stages has been increased recently without being decreased thereafter (i.e., the number of control periods which have elapsed after the number of stages had been increased recently and in which the number of stages did not change) is positive and equal to or less than a predetermined number w2.

When the determination result is Yes, in step 206, a determination is made as to whether or not the current control value F(n) shows a tendency to increase (i.e., (F(n)−F(n−1))>0). In a case where the current control value F(n) shows a tendency to increase, even when the number of stages is not increased, the current average instruction execution speed still shows a tendency to decrease in relation to the target instruction execution speed. Therefore, only in this case, in steps 116 and 118, processing for increasing the number of stages to the number of stages of a one-class-higher class is performed. In a case where the current control value F(n) does not show a tendency to increase, even when the number of stages is not increased further, the control value F(n) is expected to become less than the second threshold Th2 in a control period of the near future. Therefore, in this case, the processing for increasing the number of stages is not executed.

Meanwhile, in a case where the current control value F(n) is still equal to or greater than the second threshold Th2 even after a predetermined number of control periods have elapsed after the number of stages had increased to the number of a one-class-higher class (i.e., when a Yes determination is made in step 114 and a No determination is made in step 204), it means that the current average instruction execution speed is lower than the target instruction execution speed. Therefore, the processing for decreasing the number of stages to the number of stages of a one-class-higher class is performed for follow-up control.

After the number of stages has been once decreased to the number of a one-class-lower class, by means of steps 200 and 202, the number of stages is decreased only when the current average instruction execution speed does not show a tendency to decrease, until elapse of a predetermined number w1 of control periods in which the number of stages does not change. Accordingly, when the number of stages decreases to the number of a one-class-lower class, the number of stages can be prevented from decreasing in a subsequent control period.

When the number of stages is increased, the processing of step 204 and 206 is performed. Once the number of stages has increased to the number of a one-class-higher class, until elapse of a number u of control periods, the number of stages is not increased when the current instruction execution speed shows a tendency to increase. That is, even if the number of stages is not increased, the current instruction execution speed is highly likely to approach the target instruction execution speed. In his manner, the number of stages is prevented from increasing continuously. As a result, the power-saving effect can be maximized.

A timing chart of FIG. 6 shows the stage number control performed through the above-described processing. The horizontal axis shows the value of the control period variable n; i.e., elapse of time. The vertical axis shows the value of the control variable F(n) in section (a), and the number of stages (class) of the pipeline in section (b). In control period 1, a relation Th1<F(1)<Th2 is satisfied, and the number of stages is that of class 3. In control period 2, since a relation Th2<F(2) is satisfied, the number of stages is increased to the number of stages of a one-class-higher class; i.e., that of class 2. In control periods 3 and 4, since a relation Th1<F(n)<Th2 is satisfied, the number of stages of class 2 is maintained. In control period 5, since a relation Th2<F(S) is satisfied, the number of stages is increased to the number of stages of a one-class-higher class; i.e., that of class 1. In control periods 6 and 7, since a relation Th1<F(n)<Th2 is satisfied, the number of stages of class 1 is maintained. In control period 8, since a relation F(8)<Th1 is satisfied, the number of stages is decreased to the number of stages of a one-class-lower class; i.e., that of class 2. In control period 9 subsequent thereto, since a relation F(9)<Th1 is satisfied, according to the processing shown in FIG. 4 of Embodiment 1, the number of stages is again decreased to the number of stages of a one-class-lower class; i.e., that of class 3; i.e., the number of stages continuously decreases two times. However, in Embodiment 3, since F(9) shows an increasing trend, in control period 9, the number of stages of the current class 2 is maintained without execution of the processing for decreasing the number of stages.

Here, w1 and w2 are assumed to be 3. The determination as to whether or not F(n)−F(n−1) is less than 0 is performed from control period 8 (u=8), in which the number of stages decreased most recently, to control period 11, which is the third control period as counted from the control period 8. Only in a case where this condition is satisfied, the number of stages is decreased to that of a one-class-lower class if a relation F(n)<Th1 is satisfied. However, when F(n) does not show a decreasing trend (i.e., F(n)−F(n−1)≧0), the processing of decreasing the number of stages is not executed, and the current number of stages; i.e., that of class 2, is maintained.

Next, when a relation F(13)<Th1 is satisfied in control period 13, which is after the third control period as counted from the control period 8, the number of stages is decreased to the number of stages of a one-class-lower class; i.e., that of class 3. The next control period 14 is before the third control period as counted from the control period 13 (u=13), in which the number of stages decreased most recently, and a relation F(14)<Th1 is satisfied there. However, F(n)−F(n−1)<0, and the control value F(n) shows a trend of further decreasing. Therefore, in control period 14, the number of stages is decreased to the number of stages of a one-class-lower class; i.e., that of class 4. The next control period 15 is before the third control period as counted from the control period 13, in which the number of stages decreased most recently, and a relation F(14)<Th1 is satisfied there. However, the relation F(n)−F(n−1)<0 is not satisfied (the control value F(n) shows a trend of increasing), and the number of stages is maintained at that of the current class 4. After that point in time, similar control is performed repeatedly.

As described, in Embodiment 1, the number of stages is decreased to the number of stages of a one-class-lower class in control periods 9, 10, 11, and 15. In contrast, in Embodiment 3, the number of stages of the current class is maintained. Thus, a great change in the number of stages is prevented, and the power-saving effect can be enhanced.

In the above-described embodiment, the control value is used for determining whether to maintain the number of stages. However, the determination as to whether to maintain the number of stages may be performed on the basis of the deviation of the average value of measured instruction execution numbers from the target instruction execution number.

Embodiment 4

Next, there will be shown an embodiment in which, in order to ensure that the target instruction execution speed is present between the instruction execution speeds of two adjacent classes, the two classes; i.e., a first class A, and a second class B which is smaller in the number of stages than the first class A, are determined real time, and changing of the number of stages is restricted to the first class and the second class.

FIG. 7 shows the processing steps of the present embodiment. Steps 300 to 306 are identical with steps 100 to 106 of Embodiment 1. In step 308, a determination is made as to whether or not the deviation Δ(n) in the current control period n is negative. When the deviation Δ(n) is negative, in step 310, the current class k is set to the first class A, and a one-class-lower class k+1 is set to the second class B. When the deviation Δ(n) is determined in step 308 to be zero or positive, in step 312, the current class k is set to second class B, and a one-class-higher class k−1 is set to the first class A.

The fact that the deviation Δ(n) is negative means that the current instruction execution speed is greater than the target instruction execution speed. Therefore, it can be determined for the moment that the current class k is the first class A and the one-class-lower class k+1 is the second class B. Further, the fact that the deviation Δ(n) is zero or positive means that the current instruction execution speed is equal to or less than the target instruction execution speed. Therefore, it can be determined for the moment that the current class k is the second class B and the one-class-higher class k−1 is the first class A. In an initial state of determination, there may occur a state in which the instruction execution speed of the second class B is greater than the target instruction execution speed and the instruction execution speed of the first class A is less than the target instruction execution speed. However, in such a case, since the control value F(n) gradually decreases or increases through the following control, in later control periods, the two classes A and B having instruction execution speeds between which the target instruction execution speed is present can be detected through the processing of steps 308 to 312.

The processing of steps 314 and 320 is identical with that of steps 108 and 114 of Embodiment 1. When F(n)≦Th1, the current instruction execution speed is excessively higher than the target instruction execution speed. Therefore, in step 316, the current class k has to be controlled to the second class B for compensating for the excess, and in step 318, a clock frequency corresponding to the second class B is output. If the current class is a class which is greater in the number of stages than the class B, the number of stages is decreased to that of the second class B to thereby lower the instruction execution speed.

When F(n)≧Th2, the current instruction execution speed is excessively lower than the target instruction execution speed. Therefore, in step 322, the current class k has to be controlled to the first class A for compensating for the lack, and in step 324, a clock frequency corresponding to the first class A is output. If the current class is a class which is smaller in the number of stages than the class A, the number of stages is increased to that of the first class A to thereby increase the instruction execution speed.

FIG. 8 shows changes in the control value F(n) and the number of stages (class) in Embodiment 4. Here it is assumed that the target instruction execution speed is between the first class A and the second class B, and the number of stages is controlled to the second class B in control period 1. Since a relation F(n)≧Th2 is satisfied in control period 2, the current class k is shifted to the first class A, which is one-class-higher than the current class. Subsequently, even when the relation F(n)≧Th2 is satisfied in control period 5, the number of stages of the current class k is not increased to that of a one-class-higher class, and the current class is maintained at the first class A. Next, when a relation F(n)≦Th1 is satisfied in control period 8, this means that the instruction execution speed becomes greater than the target instruction execution speed. The current class k is shifted to the second class B, which is a one-class-lower than the current class. After that, the number of stages of the second class B is maintained up to control period 12. Next, the target instruction execution speed is assumed to have became lower than the instruction execution speed of the second class B in control period 12. In this case, since the deviation Δ(n) becomes smaller than 0 at the second class B, which is the current class, in step 310 in control period 13, the first class A is one-class-lowered to the second class B, which is the current class, and the second class B is lowered to another class which is one-class-lower than the second class B.

Since a relation F(13)≦Th1 is satisfied in step 314 in the above-described control period 13, in step 316, the current class k is one-class-lowered to the second class B. Although the relation F(n)≦Th1 is also satisfied in subsequent control periods 14 and 15, the current class is maintained at the second class B. Since a relation F(14)≧Th2 is satisfied in control period 16, the current class k is one-class raised to the first class A. Similarly, in control period 17, the first class A is maintained, and in control period 18, the current class is lowered to the second class B.

As described above, in the present embodiment, when the target instruction execution speed changes, the adjacent two classes having execution speeds between which the target instruction execution speed is present are also changed so as to follow the change. Further, when the target instruction execution speed changes, the number of stages is changed to follow the target instruction execution speed, while being restricted to the two classes. Accordingly, the maximum power-saving effect can be attained.

Embodiment 5

The present embodiment is configured such that when the instruction execution speed of a class in a certain control period is greater than the target instruction execution speed, the control value is lowered by a predetermined value V in order to increase the probability at which the number of stages of a one-class-lower class is selected in the next control period. FIG. 9 shows the processing steps of the present embodiment.

Steps 400 to 408 are identical with steps 300 to 308 of FIG. 7 of Embodiment 4. In step 408, a determination is made as to whether or not the deviation Δ(n) is negative. When the deviation Δ(n) is negative, a predetermined value V is subtracted from the control value F(n) in step 410. That is, in the current control period n, the instruction execution speed is presumed to be higher than the actual instruction execution speed by V, whereby at the time of changing of the number of stages, the number of stage of a one-class-lower class becomes more likely to be selected. That is, when the number of stages is that at the first class, there can be decreased the probability of the number of stages further increasing to the next number of stages in the next control period. There is a case where, when the number of stages increases to the number of stages of the next class, the control value becomes excessively small so that the number of stages decreases in the next control period, and the number of stages decreases further in the next control period, whereby the control value becomes excessively large in this time. As a result, in such a case, the number of stages changes alternately between non-continued classes, so that the power-saving effect cannot be enhanced.

Steps 414 to 420 are identical with steps 108 to 120 of FIG. 4 of Embodiment 1. This processing can prevent the number of stages from increasing continuously, which would otherwise result in alternate changing of the number of stages between classes which are not adjacent to each other. Thus, the power-saving effect can be enhanced.

Embodiment 6

In the following description, the above-described class will be referred to as unification degree. Further, the above-described execution speed, such as target instruction execution speed, current instruction execution speed, and current average instruction execution speed, can be referred to as throughput. The unification degree refers to the number of stages unified by means of PSU. Unification degree 1 (class 1) means that the stages are not unified. The clock frequency is assumed to be changed by a predetermined step. A target throughput (target instruction execution speed) is represented by TPtarget, which is assumed to be designated by OS, for the following reason. That is, by reference to Trevor Pering and Tom Burd and Robert Brodersen, "The Simulation and Evaluation of Dynamic Voltage Scaling Algorithms," In ISLPED1998, pp. 76-81, 1998, OS is assumed to investigate the time left after execution of each task, and calculate and designate the minimum throughput required to complete the task within a prescribed time.

When a low unification degree is selected, the clock frequency is increased, so that the throughput (current average instruction execution speed) increases. Meanwhile, when a high unification degree is selected, the clock frequency is decreased, so that the throughput (current instruction execution speed) decreases. Accordingly, the throughput (current average instruction execution speed) can be increased and decreased by increasing and decreasing the unification degree. However, when a high unification degree is selected, IPC becomes high as compared with a case where a low unification degree is selected. Therefore, the throughput (current instruction execution speed) does not change simply in proportion to the clock frequency. Further, when a high unification degree is selected, power consumption decreases as compared with a case where a low unification degree is selected.

From the above-described relation between throughput and power consumption, it can be said that, in order to minimize power consumption while achieving the above-described TPtarget, the average throughput (current average instruction execution speed) from the start to end of execution is desirably as close as possible to the TPtarget. The reason therefor will be described. When the average throughput from the start to end of execution becomes considerably lower than the TPtarget, power consumption decreases. However, since the TPtarget is not achieved, a given task cannot be completed within a time given by the OS so that the processing is affected. Meanwhile, when the average throughput from the start to end of execution becomes considerably higher than the TPtarget, the task can be completed within the time given by the OS. However, the performance becomes excessive by an amount corresponding to the excess of the throughput in relation to the TPtarget, and power consumption increases. Accordingly, in order to achieve the object of the throughput control; i.e., minimizing power consumption while achieving the TPtarget, an average throughput which is as close as possible to the TPtarget must be achieved. Therefore, variation in throughput must be controlled by properly changing the unification degree and the clock frequency during execution of a task.

In order to achieve the TPtarget, the unification degree and the clock frequency are periodically changed during execution of a task. For such control, execution of a program is divided into constant time intervals. Although in the above-described embodiment sections obtained through the division have been referred to as control periods, in the following description, such sections will be referred to as phases. During each phase, the program is executed with a fixed unification degree and a fixed clock frequency. The length of each phase is defined by time. The reason why the length of each phase is not defined by the number of cycles is that if the length of each phase is defined by the number of cycles, the time of the section of each phase becomes longer or shorter in response to a change in the clock frequency. Further, during execution of each phase, an IPC (instructions per cycle) value used for calculation of throughput is also measured. The term IPC refers to the number of instructions executed in a single cycle.

The throughput control mechanism based on PSU controls throughput by increasing and decreasing the unification degree. The details of its algorithm will now be described. First, the throughput in an i-th phase is represented by TP(i), and the average throughput from the first phase to the i-th phase is represented by TPavg(i). Here, it is assumed that execution of an n-th phase as counted from the start of execution of a program has ended. In such a case, the unification degree is changed in accordance with the following algorithm.

1. TP(n) is obtained from the measured IPC value, and TPavg(n) is obtained from TPavg(n−1) through calculation. Here, a method for obtaining the TP(n) and a method for updating from TPavg(n−1) to TPavg(n) will be described. First, TP(n) is obtained by Equation (1) from IPC(n), which is the measured IPC value of the n-th phase, and the clock frequency f(n) of the n-th phase. Further, update from TPavg(n−1) to TPavg(n) is performed by Equation (2). Here, time(i) is the time of the i-th phase. In the throughput control mechanism based on PSU, since the times of phases are all equal to one another, Equation (2) can be simplified to Equation (3) by representing the time of each phase by Tphase.

$$TP(n) = IPC(n) \times f(n) \qquad \text{[Equation 1]}$$

$$TP_{avg}(n) = \frac{TP_{avg}(n-1) \cdot \sum_{i=1}^{n-1} \text{time}(i) + TP(n) \cdot \text{time}(n)}{\sum_{i=1}^{n} \text{time}(i)} \qquad \text{[Equation 2]}$$

$$TP_{avg}(n) = \frac{TP_{avg}(n-1) \cdot (n-1) \cdot T_{phase} + TP(n) \cdot T_{phase}}{n \cdot T_{phase}} \qquad \text{[Equation 3]}$$

2. The unification degree is increased or decreased on the basis of TP(n), TPavg(n), and TPtarget, in accordance with rules shown in Table 1. Since the unification degree changing method based on the rules of Table 1 uses the current value of throughput and the average value of throughput from the start of execution to the present point in time, this changing method will be referred to as PI control (proportional integral control).

TABLE 1

| Tpavg(i) | TP(i) | PIPELINE |
|---|---|---|
| Equal to or greater than TPtarget | Equal to or greater than TPtarget | 1-Stage unification |
| Equal to or greater than TPtarget | Equal to or less than TPtarget | Does not change |
| Equal to or less than TPtarget | Equal to or greater than TPtarget | Does not change |
| Equal to or less than TPtarget | Equal to or less than TPtarget | 1-Stage unification cancellation |

3. An (n+1)-th phase is executed with a determined unification degree.

This procedure is shown in FIG. 10. In step 500, a target throughput TPtarget(n) is input, and in step 502, a throughput TP(n) in the current phase n is calculated. In step 504, an average throughput TPavg(n) up to the current phase is calculated by use of the above-described equation. Next, in step 506, a determination is made as to whether or not a condition TPavg(n)≧TPtarget(n) and a condition TP(n)≧TPtarget(n) are both satisfied. That is, a determination is made as to whether or not both the integral term and proportional term of the control value F(n) are 0 or greater. Satisfying both the conditions means that both the current average instruction execution speed and the current instruction execution speed are higher than the target instruction execution speed. Therefore, in step 510, a single-stage unification for decreasing the number of stages is performed so as to decrease the current instruction execution speed. Further, in step 512, the clock frequency is lowered.

When the conditions are not satisfied in step 506, in step 508 there is made a determination as to whether or not a condition TPavg(n)<TPtarget(n) and a condition TP(n)<TPtarget(n) are both satisfied. That is, a determination is made as to whether or not both the integral term and proportional term of the control value F(n) are 0 or lower. Satisfying both the conditions means that both the current average instruction execution speed and the current instruction execution speed are lower than the target instruction execution speed. Therefore, in step 516, a single-stage unification cancellation for increasing the number of stages is performed so as to increase the current instruction execution speed. Further, in step 518, the clock frequency is increased. When neither the condition equations in step 506 nor those in step 508 are satisfied, the current average instruction execution speed is highly likely to follow the target instruction execution speed, and therefore, the processing for changing the number of stages is not executed. Even in this case, the current average throughput can be caused to follow the target throughput.

Next, there will be described results of simulation performed for confirming the power-saving effect in the present embodiment. The simulation was performed by making use of an out-of-order execution simulator described in SimpleScalar Tool Set (Doug Burger and Todd M. Austin, "The SimpleScalar Tool Set, Version 2.0," Technical Report CS-TR-97-1342, University of Wisconsin-Madison Computer Sciences Dept. 1997). The number of stages of a pipeline was changed, and IPC was measured. The instruction set is SimpleScalar PISA. As shown in Table 2, eight benchmark programs from SPECint95 were used. Binary codes of the benchmark programs are produced by compilation through use of gcc ver. 2.7.2.3 with an option of –06-funroll-loops. In order to prevent the simulation time from becoming excessively long, inputs to the respective benchmark programs are adjusted, while their features, such as instruction mix and the frequency of occurrence of functions, are generally maintained.

TABLE 2

| Benchmark | Input | Number of executed instructions |
|---|---|---|
| compress95 | ref/bigtest.in (changed to 300000e2231) | 954 M |
| gcc | Train/amptjp.i | 1258 M |
| go | train/2stone9.in | 548 M |
| ijpeg | ref/specmun.ppm (measurement ended after 1800 M instructions) | 1800 M |
| li | test/test.lsp | 956 M |
| m88ksim | Test/ctl.in | 422 M |
| perl | train/jumble.in | 2272 M |
| vortex | train/vortex.in | 2506 M |

TABLE 3

| | |
|---|---|
| Processor core | 8-way out-of-order issue, 64-entry RUU, 32-entry LSQ, 8 int ALU, 4 int mult/div, 8 fp ALU, 4 fp mult/div, 8 memory ports |
| Brach prediction | 8K-entry PHT/gshare of 6-bit history, 2K-entry BTB, 16-entry RAS |
| Cache | L1 instruction/data 64 KB/32 B line/2-way, L2 unified cache 2 MB/64 B line/4-way |
| Memory | 64 cycles for first hit, 2 cycles for burst interval |
| TLB | Instruction 16 entry, data 32-entry, 128 cycles miss latency |

Table 3 shows the configuration of a processor assumed in the simulation. Like recent processors, the processor is assumed to have a deep pipeline. Memory access time is assumed to become slower in proportion to a decrease in the clock frequency of the processor. Therefore, the cycle number for memory access is constant irrespective of the clock frequency of the processor.

Three unification degrees (classes); i.e., unification degree 1, unification degree 2, and unification degree 4, are assumed. FIG. 11 shows pipelines of unification degree 1, unification degree 2, and unification degree 4. Table 4 shows instruction execution latencies, branch misprediction penalties, and cache hit latencies of these pipelines. As shown in the second line of the table, when the 1, 2, or 4 stages are unified, the processor operates at a clock frequency, which is 100%, 50%, or 25% of the maximum clock frequency.

TABLE 4

| | | Number of unified stages | | |
|---|---|---|---|---|
| | | 1 | 2 | 4 |
| Clock frequency | | 100% | 50% | 25% |
| Execution latency | Integer multiplication | 3 | 2 | 1 |
| | Floating-point ALU | 2 | 1 | 1 |
| | Floating-point multiplication | 4 | 2 | 1 |
| L1 cache hit latency | | 4 | 2 | 1 |
| L2 cache hit latency | | 16 | 8 | 4 |
| Brach misprediction penalty | | 20 | 10 | 5 |

Notably, for integer/floating-point division and square root calculation, the same source was repeatedly used, and a complete pipeline was not formed. Therefore, it was assumed that unification of stages is impossible. Their latencies were assumed to be 20 cycles, 12 cycles, and 24 cycles, respectively.

The power consumption for DVS is represented by Equation (4), where a is an activity factor, C is a total capacitance of switching nodes, f is a clock frequency, and V is a power supply voltage. Calculation of the power consumption for PSU is performed as follows (the above-mentioned Non-Patent Documents 5 and 6). When the pipeline stages are unified as shown in FIG. 1, the distribution of clocks to the pipeline registers is stopped, and the power consumption of the clock network decreases. Further, since the pipeline registers for which supply of clocks is stopped do not operate, the power consumption can be further reduced by an amount corresponding to power consumed by flip-flop operation. In the unification degree U, the ratio of stopped pipeline registers is $(U-1)/U$. When the ratio of the power consumption of the clock network to the total power consumption of the processor is represented by m, the power consumption of a PUS-based processor operating at the unification degree U is represented by Equation (5).

$$P_{DVS} = a \times C \times f \times V^2 \qquad \text{[Equation 4]}$$

$$P_{PSU} = P_{DVS} \times \left(1 - \frac{U-1}{U} \times m\right) = \\ a \times C \times f \times V^2 \times \left(1 - \frac{U-1}{U} \times m\right) \qquad \text{[Equation 5]}$$

In the evaluation, m was assumed to be 32% (=12%+20%). This value is determined under the following premises.

1. The ratio of power consumption of drivers at the final stage of the clock network to the total power consumption of the processor is 12% (=30%×40%).

The ratio of power consumption of the clock network to the total power consumption of the processor is 30%.

The ratio of power consumption of drives at the network final stage to the total power consumption of the clock network is 40%.

2. The ratio of power consumption of the pipeline registers is 20%.

These vales were determined with reference to the following documents, which show data of an actual processor. K. Usami, M. Igarashi, M. Knazawa, M. Takahashi, M. Harada, H. Arakida, T. Terazawa, and T. Kuroda, "Design methodology of ultra low-power MPEG4 codec core exploiting voltage scaling technologies," DAC'98, pp. 483-488, 1998. T. Sakurai, "Low-power circuit design for multimedia CMOS VLSI's," In Proceeding of SASIMI'96. L. T. Clark, et al, "An Embedded 32-b Microprocessor Core for Low Power and High Performance Applications," Journal of Solid State Circuit, Vol. 36, No. 11, pp. 1599-1608, 2001.

Notably, in the power consumption evaluation, resultant values are normalized by the power consumption for the case where the stages are not unified by means of PSU (unification degree: 1; clock frequency: 100%). Therefore, a and C are eliminated through division for normalization, and these values do not relate to the evaluation. Further, for evaluation of DVS, the value of the power supply voltage at each clock frequency was determined on the basis of Crusoe TM5400 (the above-described Non-Patent Document 1). Its value is shown in Table 5. As shown in Table 5, the clock frequency was selected from 20 frequencies (5% step) in total. Further, since the power source voltage is not changed in the case of PSU, the power source voltage was maintained at 1.65 V at all times, and the clock frequency was selected from 25%, 50%, and 100% in accordance with the selected unification degree. Further, the maximum clock frequency was 1 GHz.

TABLE 5

| Clock frequency | Supply voltage |
| --- | --- |
| 100% | 1.65 V |
| 95% | 1.65 V |
| 90% | 1.60 V |
| 85% | 1.60 V |
| 80% | 1.55 V |
| 75% | 1.55 V |
| 70% | 1.50 V |
| 65% | 1.50 V |
| 60% | 1.45 V |
| 55% | 1.40 V |
| 50% | 1.35 V |
| 45% | 1.30 V |
| 40% | 1.25 V |
| 35% | 1.20 V |
| 30% | 1.15 V |
| 25% | 1.10 V |
| 20% | 1.10 V |
| 15% | 1.10 V |
| 10% | 1.10 V |
| 5% | 1.10 V |

In the evaluation, TPtarget is represented by a percentage to the average throughput (100%) from the start to end of the execution at the time when each benchmark was executed from the beginning to the end without unifying the stages by means of PSU (unification degree: 1; clock frequency: 100%). Table 6 shows the value of each benchmark (TPtarget=100%).

TABLE 6

| Benchmark | Throughput [G instructions/s] |
| --- | --- |
| compress95 | 1.18 |
| gcc | 1.03 |
| go | 0.87 |
| ijpeg | 2.54 |
| li | 1.22 |
| m88ksim | 1.62 |
| perl | 1.43 |
| vortex | 2.14 |

Further, in the present evaluation, the overhead associated with switching of the unification degree is not included, because the number of cycles required to switch the unification degree is very small as compared with the number of cycles during which a program is executed, and the frequency of execution of the algorithm is very low.

Power consumption in the case of a PSU-based throughput control mechanism using PI control is compared with power consumption in the case of DVS. Here, a method for calculating the power consumption in the case of DVS will be described. Unlike PSU, in the case of DVS, selection of the clock frequency does not influence the IPC of a program which is being executed. Therefore, in the case of DVS, when a f % clock frequency is selected, throughput simply decreases to f %. Accordingly, in the case of DVS, under the assumption that a program is executed at a clock frequency TPtarget % from the start to end of execution thereof, the value of the power supply voltage is determined from Table 5, and this value is substituted for Equation (4) so as to obtain the power consumption.

FIG. 12 shows evaluation results. The horizontal axis of the graph represents TPtarget, and the vertical axis thereof represents the benchmark average of power consumption. The values of power consumption are those normalized by the power consumption in a case where neither DVS nor PSU is used. Notably, the time of phases was set to 1 ms. When TPtarget is 40% or greater, the power consumption in the case of PSU was observed to be smaller than that in the case of DVS. Comparison between the power consumption in the case of PSU and that in the case of DVS revealed that the power consumption in the case where the proposed PSU-based throughput control mechanism using PI control is smaller than the power consumption in the case of DVS by 40.0% (TPtarget=60%) at maximum.

In the case of DVS, when TPtarget is decreased, the power consumption decreases with TPtarget. In contrast, in the case of PSU, in a range in which the TPtarget is equal to or less than 40%, even when TPtarget is decreased, the power consumption does not decrease. The reasons therefor will be described. Whereas the clock frequency can be switched in 20 steps in DVS, in PSU, the clock frequency can be switched only in three steps. Therefore, in the case of PSU, when TPtarget is decreased, the throughput does not decrease to TPtarget even if the unification degree 4 is continuously selected from the start to end of execution of a program. Accordingly, the power consumption did not decrease and became saturated in the vicinity of TPtarget=40%. However, even when TPtarget is low, the power consumption in the case of PSU can be reduced by providing a higher unification degree, such as unification degree 8, or decreasing the clock frequency only, while maintaining the unification degree 4.

FIG. 13 shows the throughput in the case of PUS using PI control. The horizontal axis of the graph represents TPtarget, and the vertical axis thereof represents the benchmark average of throughput normalized by TPtarget. Notably, since for the case of DVS the power consumption is obtained by the previously-described method, the throughput completely coincides with TPtarget at all times.

As can be seen in FIG. 13, in a region in which TPtarget is low, the throughput for PSU greatly deviates from TPtarget. This occurs because when TPtarget is low, the throughput cannot be decreased to TPtarget even if the unification degree 4 is continuously selected, as having been already described. In contrast, in a region in which TPtarget is 60% or greater, the difference between the throughput and TPtarget is less than 0.2%. Checking of the difference for individual benchmarks revealed that the difference is about 1% for a benchmark in which the throughput deviates from TPtarget to the largest extent, and causes no problem.

Embodiment 7

PI control, which is adapted only to cause throughput to approach TPtarget but is not adapted to reduce power consumption, is not the optimum algorithm. Therefore, in the present embodiment, the following control is employed. Notably, the following description regarding the power-saving effect also applies to the power-saving effect for the case where a restriction is imposed on the changing of class at the time of switching the number of stages in the above-described Embodiment 3, 4, and 5.

The relation between throughput which can be achieved at each unification degree and power consumption at that time was investigated as follows. Throughput TP(n) was obtained by first measuring IPC at each unification degree, and then obtaining the throughput TP(n) in accordance with Equation (1) from the value of the benchmark average of the IPC and the value of the clock frequency f(n). Corresponding power consumption was obtained in accordance with Equations (4) and (5). FIG. 14 shows the thus-obtained relation between throughput and power consumption for each unification degree. The horizontal axis represent throughput, and the vertical axis represents power consumption normalized by the power consumption in the case where the unification degree 1 is selected. A solid line connects the unification degrees 1, 2, and 4. A dotted line connects the unification degrees 1 and 4 only. Since values in this graph are benchmark averages of IPC from the start to end of execution of each program, strictly speaking, the actual relation between throughput and power consumption does not necessarily coincide with that of this graph. However, in order to simplify the description, the actual relation is assumed to completely coincide with that of this graph.

Here, there is considered a case where TPtarget is provided as usual and each program is executed while the unification degree is changed, the relation between the average throughput and the average power consumption is plotted on the graph of FIG. 14; and the plotted point is referred to as P(TP, power). The position of P(TP, power) is determined by the ratios at which the respective unification degrees are selected, and P(TP, power) is located on or inside the sides of a triangle shown in the graph. For example, when only the unification degrees 1 and 2 are selected, P(TP, power) is located on a line connecting two points representing the unification degrees 1 and 2. When the ratio of the unification degree 4 is gradually increased from that state, with the throughput maintained constant, P(TP, power) moves always from the line connecting the two points representing the unification degrees 1 and 2, and gradually approaches a line connecting two points representing the unification degrees 1 and 4.

As can be understood from the graph, the line connecting the unification degrees 1 and 4 is located above the line connecting the unification degree 1, 2, 4, over its entire length. This means that in the case where a certain TPtarget is to be achieved, as compared with the case where the TPtarget is achieved through selecting the unification degrees 1 and 4 only, power consumption becomes lower when the TPtarget is achieved through selection of the unification degrees 1 and 2 only (for the case where the TPtarget is located between the throughputs of the unification degree 1 and 2) or through selection of the unification degrees 2 and 4 only (for the case where the TPtarget is located between the throughputs of the unification degrees 2 and 4). The characteristic of this graph that the unification degree 2 is located below the line connecting the unification degrees 1 and 4 does not depend on the assumption of the simulation. The reason therefor will now be described.

First, the number of pipeline stages of the processor is assumed to be S. When switching from the unification degree 1 to the unification degree 2 is effected, the number of pipeline stages changes from S to S/2, so that the number of pipeline stages decreases by S/2. However, when switching from the unification degree 2 to the unification degree 4 is effected, the number of pipeline stages changes from S/2 to S/4, so that the number of pipeline stages decreases by S/4 only. Accordingly, the effect of reducing power consumption through stage unification in the case of switching from the unification degree 2 to the unification degree 4 becomes smaller than that in the case of switching from the unification degree 1 to the unification degree 2. As a result, in the graph, the inclination of the line connecting the unification degrees 2 and 4 becomes smaller than that of the line connecting the unification degrees 1 and 2.

By virtue of the above-described characteristics of PSU, power consumption can be reduced more through a design in which only the unification degrees 1 and 4 are not selected frequently. In view of the above, the inventors have improved the PI control so as to select the unification degree 2 as often as possible, so long as throughput does not greatly deviate from TPtarget.

With respect to this improvement, in Embodiment 3, abrupt change of classes is prevented; in Embodiment 4, changing of the number of stages is restricted to the two classes having the respective one of two instruction execution speeds sandwiching the target instruction execution speed; and in Embodiment 5, when the number of stages is controlled at the higher class of the two classes having the respective one of two instruction execution speeds sandwiching the target instruction execution speed, the control is performed so as to increase the probability at which the number of stages is controlled to a lower class in the next control period.

Next, the improvement will be described in detail. Here, when execution of the i-th phase ends, the calculation of Equation (6) is performed, wherein TPavg(i) is the average throughput from the first phase to the i-th phase, and a and b are constants in the control. Further, Ucurrent(i) is a value corresponding to the unification degree of the i-th phase, and is determined by Equation (7). The unification degree for the next phase is determined from the Unext obtained by Equation (7) in accordance with Table 7. That is, the first term of Equation (6) is a term which causes the throughput to approach TPtarget, and the second term thereof is a term for selecting the unification degree 2 as often as possible.

$$U_{next} = a\frac{TP_{target} - TP_{avg}(i)}{TP_{target}} + b \cdot U_{current}(i) \qquad \text{[Equation 6]}$$

$$U_{current}(i) = \begin{array}{l} -1 \\ 0 \\ 1 \end{array} \begin{array}{l} \text{(unificatrion degree 1)} \\ \text{(undifcation degree 2)} \\ \text{(unification degree 4)} \end{array} \qquad \text{[Equation 7]}$$

TABLE 7

| Value of Unext | Next phase |
|---|---|
| $r \leq U_{next}$ | unification degree 1 |
| $-r < U_{next} < r$ | unification degree 2 |
| $U_{next} \leq -r$ | unification degree 4 |

The results of evaluation of a PSU-based throughput control utilizing an improved algorithm will be shown below. FIGS. 15 and 16 show power consumption and throughput for various TPtarget values measured for a case where the improved control mechanism is employed. The horizontal axis of FIG. 15 represents TPtarget, and the vertical axis thereof represents the benchmark average of power consumption. The horizontal axis of FIG. 16 represents TPtarget, and the vertical axis thereof represents the benchmark average of throughput normalized by TPtarget. In the graphs, DVS represents data for a case where a DVS-based throughput control mechanism is employed; PSU PI represents data for a case where a PSU-based throughput control mechanism using PI of Embodiment 6 is employed; UNI feedback represents data for a case where a throughput control mechanism of Embodiment 7 is employed, which is improved from Embodiment 6 and has a control mechanism for feedback of the unification degree; and PSU ideal represents the lower limit of power consumption reduction attained through employment of PSU. The value of PSU ideal was determined as follows. For each benchmark, IPC was previously measured from the start to end of execution; unification degrees which satisfy TPtarget and which maximize the power efficiency were selected. Further, the maximum clock frequency was set to 1 GHz. In addition, the values of the parameters in Equation (6) of UNI feedback were set such that a=100, and b=1.

As shown in FIG. 15, at any value of TPtarget, the power consumption of UNI feedback became approximately equal to or lower than that of PSU PI. When TPtarget=80%, the power consumption of UNI feedback was smaller than that of PSU PI by 10.0% on the benchmark average, and 28.8% (compress95) at the maximum. At that time, power consumption could be lowered by an amount corresponding to 88.9% of the capable amount of power consumption which PSU can reduce from that of DVS. Further, the reduction amount of the power consumption of UNI feedback from that of DVS is equal to 39.5% of the power consumption of DVS on the benchmark average, and 55.5% (go) at the maximum when TPtarget=60%.

Further, as shown in FIG. 16, the throughput in the case where the control mechanism which feed-backs the unification degree is employed deviates from TPtarget to a slightly greater degree, as compared with the throughput in the case where the control mechanism utilizing PI control is employed. However, in a region in which TPtarget is equal to or greater than 60%, the difference between the benchmark average of throughput and TPtarget is smaller than 2%, and the deviation is considered not excessively large.

As described above, UNI feedback, which has been improved from PSU PI, was able to suppress the power consumption to the vicinity of the power consumption reduction limit of PSU, while preventing the throughput from deviating greatly from TPtarget.

The above-described embodiments may be modified to use DVS as well in order to further reduce power consumption as compared with that at a class in which the number of stages is small or at the lowest class.

In the above-described embodiments, the stage number controller is mainly realized by the MPU 50. However, the stage number controller may be configured by means of a logic circuit. This logic circuit is also operated in the respective periods by 100 ms intervals, and is switched to a sleep mode in periods other than the executing periods, whereby an increase in power consumption attributable to the stage number controller can be suppressed.

Further, the stage number control may be performed by OS. In response to timer interruption at 100 ms intervals, a monitor program for determining whether to switch the number of stages is operated. Only when it is determined that the number of stages must be switched, fetching of instruction words is stopped; and clocks, the number of which corresponds to the number of stages, are input until a data signal passes through all the pipeline registers. After that, the above-described processing for switching the number of stages of the pipeline and processing for switching the clock frequency are executed, the fetching operation is resumed, and clocks are supplied to the pipeline registers. In this manner, the stage number control can be performed by software.

Embodiment 8

Next, there will be described an embodiment in which the stage number controller is realized by means of a logic circuit. The logic circuit of the present embodiment includes an issued-instruction-number count section 64, a throughput calculation section 65, a pipeline-stage-number calculation section 66, and a pipeline-stage-number switching section 67. Of various sections of the logic circuit, the issued-instruction-number count section 64 operates at all times, but stops during execution periods of 100 ms intervals in which stage number control is performed. Electricity is supplied to the throughput calculation section 65, the pipeline-stage-number calculation section 66, and the pipeline-stage-number switching section 67 such that they operate normally only in the 100 ms-interval execution periods in which stage number control is performed, and operate in a sleep mode in periods other than the execution periods.

FIG. 17 is a circuit block diagram of the stage number controller configured by means of a logic circuit. In the present embodiment, in order to simplify the description, a four-stage pipeline including a fetch unit 60, a decode unit 61, an execution unit 62, and a write-back unit 63 is assumed. However, the number of stages may be as large as 30, and can be arbitrarily determined. The throughput calculation section 64 (counter) counts the number of instructions issued from the decode unit 61 to the execution unit. In this case, instructions which stay within a computer and have not been completed are counted; however, this does not raise any practical problem because accuracy of instruction units is rarely required in actual applications.

In the case of a computer having a reorder buffer, the number of instructions which retire from the reorder buffer may be counted. This method can count the completed instructions more accurately than does the above-described method. IPC(n), which is the IPC of an n-th phase, is calculated by the following Equation.

$$IPC(n) = \text{(the number of issued instructions)}/\text{(the number of cycles of the } n\text{-th phase)}. \quad \text{[Equation 8]}$$

In a case where the time of each phase can be adjusted, if the number of cycles of a single phase is set to 2n, the division can be carried out by shift of n times, whereby the circuit can be simplified.

Next, the throughput calculation section 65 calculates throughput TP(n) of the n-th phase in accordance with the above-described Equation 2.

Subsequently, the throughput calculation section 65 calculates the average TPavg(n) of throughputs from the 0-th phase to the n-th phase in accordance with the above-described Equation 3.

However, since the value of $y = TPavg(n-1) \times (n-1)$ is calculated in the (n−1)-th phase, it is possible to retain its value in a register and calculate the value of $[y+TP(n)] \div n$ in the next phase; i.e., the n-th phase.

Next, the pipeline-stage-number calculation section 66 determines the pipeline unification degree $U_{next}$ of the next phase in accordance with the above-described Equation 6. The pipeline-stage-number calculation section 66 then determines the unification degree (the number of pipeline stages) of the next phase from $U_{next}$ with reference to Table 8. The constants a and b of Equation 6 are determined such that when the value of TPtarget−TPavg(i) is large, the first term is dominant, and when the value decreases, the second terms becomes dominant.

TABLE 8

| Value of Unext | Unification degree of the next phase | The number of pipeline stages of the next phase |
|---|---|---|
| r ≤ Unext | Unification degree (class) 1 | 4 |
| −r < Unext < r | Unification degree (class) 2 | 2 |
| Unext ≤ −r | Unification degree (class) 4 | 1 |

Embodiment 9

As shown in FIG. 18, the present embodiment includes a supply voltage controller 56 for changing the supply voltage such that the supply voltage linearly changes with the frequency of clocks output from the clock generator 52. This supply voltage controller 56 supplies electrical power not only to the MPU 50, the counter 41, the target value setting register 51, the ROM 54, the RAM 55, and the I/O 53, but also to the main CPU and other devices 57. This embodiment differs from the above-described Embodiments 1 to 8 in that the supply voltage controller 56 is provided. As shown in Table 9, the supply voltage controller 56 controls the supply voltage such that the power supply voltage decreases when the frequency decreases in each class. The supply voltage at the highest frequency $f_m k$ in each class k is equal to the maximum voltage $V_m$ (=1.65), for the following reason. When the stages are unified, the number of logic circuits per stage usually becomes double, so that the operable frequency at the same voltage decreases to ½ between adjacent classes.

TABLE 9

| Clock frequency | Unification degree 1 | Unification degree 2 | Unification degree 4 |
|---|---|---|---|
| 100% | 1.65 V | — | — |
| 95% | 1.65 V | — | — |
| 90% | 1.60 V | — | — |
| 85% | 1.60 V | — | — |
| 80% | 1.55 V | — | — |
| 75% | 1.55 V | — | — |
| 70% | 1.50 V | — | — |
| 65% | 1.50 V | — | — |
| 60% | 1.45 V | — | — |
| 55% | 1.40 V | — | — |
| 50% | 1.35 V | 1.65 V | — |
| 45% | 1.30 V | 1.60 V | — |
| 40% | 1.25 V | 1.55 V | — |
| 35% | 1.20 V | 1.50 V | — |
| 30% | 1.15 V | 1.45 V | — |
| 25% | 1.10 V | 1.35 V | 1.65 V |
| 20% | 1.10 V | 1.25 V | 1.55 V |
| 15% | 1.10 V | 1.15 V | 1.45 V |
| 10% | 1.10 V | 1.10 V | 1.25 V |
| 5% | 1.10 V | 1.10 V | 1.10 V |

The power consumption in a DVS control scheme in which the supply voltage is changed in accordance with the clock frequency is expressed by Equation (4). Further, power consumption in a PSU control scheme according to the present invention is expressed by Equation (5). When the stages of the pipeline are unified, the instruction execution number (IPC) in a single clock cycle increases to about 1.46 times that before the unification. Therefore, even when the clock frequency decreases to ½, the current instruction execution speed decreases only to about 0.73 times the current instruction execution speed before the unification. In the case of DVS control, the current instruction execution speed decreases to ½ through one-stage unification. Accordingly, if the target instruction execution speed in the PSU control and the target instruction execution speed in the DVS control are made equal to each other, the PSU control can save power more than the DVS control. FIG. 19 shows the relation between current instruction execution speed and power consumption for the DVS control scheme and the PSU control scheme, for the case where, in consideration of an increase in IPC due to unification of stages, the clock frequency in each class is set to ½, ¼, or ⅛ of the maximum frequency, and the supply voltage is set to the maximum voltage Vm. However, in the characteristic chart of FIG. 19, the current instruction execution speed at the time when the supply voltage is set to the maximum voltage Vm and the clock frequency is set to the maximum frequency fm is normalized to 1 and the power consumption at that time is normalized to 1.

In all the above-described embodiments, when the stage number control is performed, the frequency in each class is set to ½, ¼, or ⅛ of the maximum clock frequency fm. When the number of stages is decreased, subsequently, the supply voltage is gradually decreased to a supply voltage at which the CPU can operate at that frequency. Further, when the number of stages is to be increased, the supply voltage is gradually increased to a supply voltage at which the CPU can operate at the clock frequency of the changed class, and then the number of stages is switched. By virtue of this control, when a control for changing the supply voltage is performed, the number of stages can be changed without stopping the CPU.

Further, as shown in FIG. 19, when the current instruction execution speed is the same, the power consumption in the case of PSU control is lower than the power consumption in the case of DVS control. Therefore, the following control can be performed in all of the above-described embodiments. After the stages are unified through single-stage unification so as to bring the pipeline into class 2, the clock frequency is set to fmk, which is an initial value, and the supply voltage is set to the maximum value Vm, which is an initial value. After the number of stages is changed, the clock frequency and the supply voltage are variably controlled in accordance with the control value, which is determined in accordance with the above-described deviation between the target instruction execution speed and the current instruction execution speed. That is, when the target instruction execution speed is located at point T between class 2 and class 3 on a characteristic curve for PSU of FIG. 19, in all of the above-described embodiments, control at class 2 and control at class 3 are alternately performed in accordance with the control value. In the present embodiment, in this case, in order to realize the target instruction execution speed of the point T, the number of stages of class 2 is maintained, and the clock frequency and the supply voltage are changed in accordance with the control value. Needless to say, in this case, when the current instruction execution speed is higher than the target instruction execution speed and the above-mentioned control value becomes negative, the unification of class 3 is performed. In this case, DVS control for continuously controlling the clock frequency and the supply voltage in accordance with the control value may be performed for class 3. Further, even when the target instruction execution speed is present between class 3 and class 4, the DVS control for continuously controlling the clock frequency and the supply voltage in accordance with the control value is performed for class 3. Moreover, when the target instruction execution speed is present between class 3 and class 4, the DVS control may be performed for class 4.

By virtue of such control, the supply voltage can be lowered, and the power consumption can be further reduced.

The DVS control may be performed so as to change the clock frequency only, and gradually lower the voltage toward the lowest voltage at which the CPU can operate at that frequency.

INDUSTRIAL APPLICABILITY

The present invention can be applied to processing apparatus and microprocessors which provide the maximum power-saving effect.

The invention claimed is:

1. A processing apparatus in which logic circuits are connected in series by pipeline registers and which performs pipeline processing, the apparatus comprising:
instruction-execution-number measurement means for measuring an instruction execution number, which is the number of instructions executed per unit time;
target-instruction-execution-number setting means for setting a target instruction execution number, which is a target number of instructions to be executed per unit time;
control value calculation means for calculating a control value by performing proportional and integral processing on a deviation of the target instruction execution number set by the target-instruction-execution-number setting means from the instruction execution number measured by the instruction-execution-number measurement means;
stage number changing means for changing the number of stages of the pipeline by performing unification processing or unification cancellation processing in accordance with the control value calculated by the control value calculation means, the unification processing being adapted to stop supply of clocks to selected pipeline registers and control the pipeline such that a signal passes through the pipeline registers, so as to partially connect the stages of the pipeline to thereby reduce the number of stages of the pipeline, and the unification cancellation processing being adapted to resume the supply of clocks to the selected pipeline registers and control the pipeline such that the pipeline registers latch the signal in synchronism with the clocks, so as to separate the connected stages of the pipeline to thereby increase the number of stages of the pipeline; and
clock frequency changing means for changing a frequency of clocks supplied to the pipeline registers in accordance with the number of stages changed by the stage number changing means.

2. A processing apparatus according to claim 1, wherein the clock frequency changing means changes the clock frequency such that the smaller the number of stages changed by the stage number changing means, the lower the clock frequency, and the larger the number of stages changed by the stage number changing means, the higher the clock frequency.

3. A processing apparatus according to claim 1, wherein the control value changing means uses, as the control value, a value obtained by adding a value obtained by differentiating the deviation with respect to time to a value obtained by performing proportional and integral processing on the deviation.

4. A processing apparatus according to claim 2, wherein the control value changing means uses, as the control value, a value obtained by adding a value obtained by differentiating the deviation with respect to time to a value obtained by performing proportional and integral processing on the deviation.

5. A processing apparatus according to claim 1, wherein the stage number changing means performs the unification processing for decreasing the number of stages when the control value obtained by the control value calculation means is smaller than a predetermined value, and performs the unification cancellation processing for increasing the number of stages when the control value is larger than the predetermined value.

6. A processing apparatus according to claim 2, wherein the stage number changing means performs the unification processing for decreasing the number of stages when the control value obtained by the control value calculation means is smaller than a predetermined value, and performs the unification cancellation processing for increasing the number of stages when the control value is larger than the predetermined value.

7. A processing apparatus according to claim 1, wherein when the control value is equal to or less than a first threshold, the stage number changing means performs the unification processing such that the number of stages changes to the number of stages of a one-class-lower class; and when the control value is equal to or greater than a second threshold greater than the first threshold, the stage number changing means performs the unification cancellation processing such that the number of stages changes to the number of stages of a one-class-higher class.

8. A processing apparatus according to claim 2, wherein when the control value is equal to or less than a first threshold, the stage number changing means performs the unification processing such that the number of stages changes to the number of stages of a one-class-lower class; and when the control value is equal to or greater than a second threshold greater than the first threshold, the stage number changing means performs the unification cancellation processing such that the number of stages changes to the number of stages of a one-class-higher class.

9. A processing apparatus according to claim 1, wherein when both the integral term and the proportional term of the control value are negative, the stage number changing means performs the unification processing such that the number of stages changes to the number of stages of a one-class-lower class; when both the integral term and the proportional term of the control value are positive, the stage number changing means performs the unification cancellation processing such that the number of stages changes to the number of stages of a one-class-higher class; and when the product of the integral term and proportional term of the control value is negative or zero, the stage number changing means does not change the number of stages.

10. A processing apparatus according to claim 1, wherein even when the unification cancellation processing is executed in a certain control period and a condition for performing the unification cancellation processing is satisfied in a control period subsequent to the certain control, the stage number changing means does not perform the unification cancellation processing and maintains the number of stages if the control value or the deviation of the average value of the measured instruction execution number from the target instruction execution number shows a tendency to increase; and even when the unification processing is executed in a certain control period and a condition for performing the unification processing is satisfied in a control period subsequent to the certain control, the stage number changing means does not perform the unification processing and maintains the number of stages if the control value or the deviation of the average value of the measured instruction execution number from the target instruction execution number shows a tendency to decrease.

11. A processing apparatus according to claim 8, wherein even when the unification cancellation processing is executed in a certain control period and a condition for performing the unification cancellation processing is satisfied in a control period subsequent to the certain control, the stage number changing means does not perform the unification cancellation processing and maintains the number of stages if the control value or the deviation of the average value of the measured instruction execution number from the target instruction execution number shows a tendency to increase; and even when the unification processing is executed in a certain control period and a condition for performing the unification processing is satisfied in a control period subsequent to the certain control, the stage number changing means does not perform the unification processing and maintains the number of stages if the control value or the deviation of the average value of the measured instruction execution number from the target instruction execution number shows a tendency to decrease.

12. A processing apparatus according to claim 1, wherein the stage number changing mean restricts the switching of the number of stages to a number of stages of a first class in which the control value or the deviation associated with the set target instruction execution number becomes negative and a number of stages of a second class which is adjacent to the first class and in which the control value or the deviation becomes positive.

13. A processing apparatus according to claim 8, wherein the stage number changing mean restricts the switching of the number of stages to a number of stages of a first class in which the control value or the deviation associated with the set target instruction execution number becomes negative and a number of stages of a second class which is adjacent to the first class and in which the control value or the deviation becomes positive.

14. A processing apparatus according to claim 10, wherein the stage number changing mean restricts the switching of the number of stages to a number of stages of a first class in which the control value or the deviation associated with the set target instruction execution number becomes negative and a number of stages of a second class which is adjacent to the first class and in which the control value or the deviation becomes positive.

15. A processing apparatus according to claim 1, wherein a number of stages at which the control value or the deviation associated with the set target instruction execution number becomes negative is defined as a number of stages of a first class; a number of stages which is a number of stages of a class adjacent to the first class and at which the control value or the deviation becomes positive is defined as a number of stages of a second class; and when the number of stages before being changed is the number of stages of the first class, the control value is corrected in accordance with the number of stages before being changed, so as to increase the probability at which the number of stages of the second class is selected.

16. A processing apparatus according to claim 8, wherein a number of stages at which the control value or the deviation associated with the set target instruction execution number becomes negative is defined as a number of stages of a first class; a number of stages which is a number of stages of a class adjacent to the first class and at which the control value or the deviation becomes positive is defined as a number of stages of a second class; and when the number of stages before being changed is the number of stages of the first class, the control value is corrected in accordance with the number of stages before being changed, so as to increase the probability at which the number of stages of the second class is selected.

17. A processing apparatus according to claim 10, wherein the number of stages can be changed to a maximum number of stages, an intermediate number of stages, and a minimum number of stages; and the control value calculation means corrects the control value in accordance with the number of stages before being changed such that the probability at which the intermediate number of stages is selected increases.

18. A processing apparatus according to claim 1, further comprising supply voltage control means for lowering supply voltage in accordance with the number of stages and the clock frequency in control performed at the number of stages changed by the stage number changing means.

19. A processing apparatus according to claim 18, wherein the supply voltage control means gradually decreases or increases the supply voltage when the number of stages is changed.

20. A processing apparatus according to claim 18, further comprising DVS control means for continuously changing the clock frequency and the supply voltage in accordance with the control value when the number of stages is changed by the stage number changing means.

* * * * *

UNITED STATES PATENT AND TRADEMARK OFFICE
CERTIFICATE OF CORRECTION

| | |
|---|---|
| PATENT NO. | : 7,836,326 B2 |
| APPLICATION NO. | : 11/878634 |
| DATED | : November 16, 2010 |
| INVENTOR(S) | : Toshio Shimada et al. |

It is certified that error appears in the above-identified patent and that said Letters Patent is hereby corrected as shown below:

Please replace the following paragraphs, as follows:

Lines 15-24 of Column 5

A fourth invention is directed to the processing apparatus characterized in that the stage number changing means performs the unification processing for decreasing the number of stages when the control value obtained by the control value calculation means is smaller than a predetermined value, and performs the unification cancellation processing for increasing the number of stages when the control value is larger than the predetermined value.

Lines 55-65 of Column 5

A fifth invention is directed to the processing apparatus characterized in that when the control value is equal to or less than a first threshold, the stage number changing means performs the unification processing such that the number of stages changes to the number of stages of a one-class-lower class; and when the control value is equal to or greater than a second threshold greater than the first threshold, the stage number changing means performs the unification cancellation processing such that the number of stages changes to the number of stages of a one-class-higher class.

Lines 18-31 of Column 6

A sixth invention is directed to the processing apparatus characterized in that when both the integral term and the proportional term of the control value are negative, the stage number changing means performs the unification processing such that the number of stages changes to the number of stages of a one-class-lower class; when both the integral term and the proportional term of the control value are positive, the stage number changing means performs the unification cancellation processing Signed and Sealed this
Twenty-sixth Day of April, 2011

David J. Kappos
*Director of the United States Patent and Trademark Office* such that the number of stages changes to the number of stages of a one-class-higher class; and when the product of the integral term and the proportional term of the control value is negative or zero, the stage number changing means does not change the number of stages.

In this control, the control for changing the number of stages in accordance with the control value is performed on the basis of the integral term and proportional term, separately, of

Lines 36-55 of Column 6

A seventh invention is directed to the processing apparatus characterized in that even when the unification cancellation processing is executed in a certain control period and a condition for performing the unification cancellation processing is satisfied in a control period subsequent to the certain control, the stage number changing means does not perform the unification cancellation processing and maintains the number of stages if the control value or the deviation of the target instruction execution number from the average value of the measured instruction execution number per unit time shows a tendency to decrease; and even when the unification processing is executed in a certain control period and a condition for performing the unification processing is satisfied in a control period subsequent to the certain control, the stage number changing means does not perform the unification processing and maintains the number of stages if the control value or the deviation of the target instruction execution number from the average value of the measured instruction execution number per unit time shows a tendency to increase.

Line 56 of Column 6 through line 9 of Column 7

The present invention prevents the class of the number of stages from continuously changing to a higher class or a lower class in successive control periods. When the class is caused to continuously change to a higher class or a lower class in successive control periods, the change width of the number of stages increases, and the power-saving effect is not high. Accordingly, in the present invention, the class of the number of stages is prevented from greatly changing. That is, when the unification cancellation processing is performed so as to change the number of stages to the number of stages of a one-class-higher class, the current average instruction execution speed ought to increase. Therefore, in a case where the control value or the deviation of the target instruction execution speed from the current average instruction execution speed shows a tendency to decrease, even when the condition for performing the unification cancellation processing for changing the number of stages to the number of stages of a one-class-higher class is still satisfied in the next control period, the processing for increasing the number of stages is not performed. With this control, abrupt increase of the number of stages is prevented.

CERTIFICATE OF CORRECTION (continued)
U.S. Pat. No. 7,836,326 B2

Lines 10-23 of Column 7

In contrast, when the unification processing is performed so as to change the number of stages to the number of stages of a one-class-lower class, the current average instruction execution speed ought to decrease. Therefore, in a case where the control value or the deviation of the target instruction execution speed from the current average instruction execution speed shows a tendency to increase, even when the condition for performing the unification processing for changing the number of stages to the number of stages of a one-class-lower class is still satisfied in the next control period, the processing for decreasing the number of stages is not performed. With this control, abrupt decrease of the number of stages is prevented. By virtue of these controls, more effective power saving can be realized.

Lines 24-33 of Column 7

An eighth invention is directed to the processing apparatus characterized in that the stage number changing mean restricts the switching of the number of stages to a number of stages of a first class in which the control value or the deviation (the target instruction execution speed - the current instruction execution speed) associated with the set target instruction execution number becomes negative and a number of stages of a second class which is adjacent to the first class and in which the control value or the deviation becomes positive.

Lines 22-35 of Column 8

A ninth invention is directed to the processing apparatus characterized in that a number of stages at which the control value or the deviation associated with the set target instruction execution number becomes negative is defined as a number of stages of a first class; a number of stages which is a number of stages of a class adjacent to the first class and at which the control value or the deviation becomes positive is defined as a number of stages of a second class; and when the number of stages before being changed is the number of stages of the first class, the control value is corrected in accordance with the number of stages before being changed, so as to increase the probability at which the number of stages of the second class is selected.

Line 63 of Column 8 through line 21 of Column 9

A tenth invention is directed to the processing apparatus characterized in that the number of stages can be changed to a maximum number of stages, an intermediate number of stages, and a minimum number of stages; and the control value calculation means corrects the control value in accordance with the number of stages before being changed such that the probability at which the intermediate number of stages is selected increases.

In the case where the number of stages can be changed to the maximum number of stages, the intermediate number of stages, and the minimum number of stages, if the probability at which the intermediate number of stages is selected is intentionally increased, the number of stages is prevented from successively increasing to the maximum number of stages after having increased to the intermediate number of stages. Similarly, the number of stages is prevented from successively decreasing to the minimum number of stages after having decreased to the intermediate number of stages.

An eleventh invention is characterized by comprising supply voltage control means for lowering supply voltage in accordance with the number of stages and the clock frequency in control performed at the number of stages changed by the stage number changing means.

A twelfth invention is characterized in that the supply voltage control means gradually decreases or increases the supply voltage when the number of stages is changed.

Lines 22-26 of Column 9  A thirteenth invention is characterized by comprising DVS control means for continuously changing the clock frequency and the supply voltage in accordance with the control value when the number of stages is changed by the stage number changing means. [Effects of the Invention]

Lines 49-64 of Column 10

In the seventh invention, even when the condition for further increasing the number of stages is satisfied in a control period subsequent to a control period in which the number of stages has been increased, the number of stages is not increased and the current number of stages is maintained if the control value or the deviation of the target instruction execution number from the average value of the measured number of instructions executed per unit time shows a tendency to decrease. This means that when this condition is satisfied in a plurality of successive control periods after the number of stages is increased, the current number of stages is maintained. That is, the current average instruction execution speed tends to reach the target instruction execution speed sooner or later. Therefore, it is unnecessary to increase the number of stages immediately. This processing prevents a change to a class having a larger number of stages.

CERTIFICATE OF CORRECTION (continued)
U.S. Pat. No. 7,836,326 B2

Line 65 of Column 10 through
line 13 of Column 11

In contrast, even when the condition for further decreasing the number of stages is satisfied in a control period subsequent to a control period in which the number of stages has been decreased, the number of stages is not decreased and the current number of stages is maintained if the control value or the deviation of the target instruction execution number from the average value of the measured number of instructions executed per unit time shows a tendency to increase. This means that when this condition is satisfied in a plurality of successive control periods after the number of stages is decreased, the current number of stages is maintained. That is, the current average instruction execution speed tends to reach the target instruction execution speed sooner or later. Therefore, it is unnecessary to decrease the number of stages immediately. This processing prevents a change to a class having a smaller number of stages.

Lines 23-29 of Column 20

In the above-described embodiment, the control value is used for determining whether to maintain the number of stages. However, the determination as to whether to maintain the number of stages may be performed on the basis of the deviation of the target instruction execution number from the average value of measured instruction execution numbers.

Lines 46-62 of Column 24

This procedure is shown in FIG. 10. In step 500, a target throughput TPtarget(n) is input, and in step 502, a throughput TP(n) in the current phase n is calculated. In step 504, an average throughput TPavg(n) up to the current phase is calculated by use of the above-described equation. Next, in step 506, a determination is made as to whether or not a condition TPavg(n) ≥ TPtarget(n) and a condition TP(n) ≥ TPtarget(n) are both satisfied. That is, a determination is made as to whether or not both the integral term and proportional term of the control value F(n) are 0 or lower. Satisfying both the conditions means that both the current average instruction execution speed and the current instruction execution speed are higher than the target instruction execution speed. Therefore, in step 510, a single-stage unification for decreasing the number of stages is performed so as to decrease the current instruction execution speed. Further, in step 512, the clock frequency is lowered.

**Line 63 of Column 24 through
line 14 of Column 25**

When the conditions are not satisfied in step 506, in step 508 there is made a determination as to whether or not a condition TPavg(n) < TPtarget(n) and a condition TP(n) < TPtarget(n) are both satisfied. That is, a determination is made as to whether or not both the integral term and proportional term of the control value F(n) are greater than 0. Satisfying both the conditions means that both the current average instruction execution speed and the current instruction execution speed are lower than the target instruction execution speed. Therefore, in step 516, a single-stage unification cancellation for increasing the number of stages is performed so as to increase the current instruction execution speed. Further, in step 518, the clock frequency is increased. When neither the condition equations in step 506 nor those in step 508 are satisfied, the current average instruction execution speed is highly likely to follow the target instruction execution speed, and therefore, the processing for changing the number of stages is not executed. Even in this case, the current average throughput can be caused to follow the target throughput.

**In column 35, line 46 to column 38, line 62,
replace the original 20 claims with the following 21
claims, as follows:**

[Claim 1]

A processing apparatus in which logic circuits are connected in series by pipeline registers and which performs pipeline processing, the apparatus comprising:
instruction-execution-number measurement means for measuring an instruction execution number, which is the number of instructions executed per unit time;
target-instruction-execution-number setting means for setting a target instruction execution number, which is a target number of instructions to be executed per unit time;
control value calculation means for calculating a control value by performing proportional and integral processing on a deviation of the target instruction execution number set by the target-instruction-execution-number setting means from the instruction execution number measured by the instruction-execution-number measurement means;
stage number changing means for changing the number of stages of the pipeline by performing unification processing or unification cancellation processing in accordance with the control value calculated by the control value calculation means, the unification processing being adapted to stop supply of clocks to selected pipeline registers and control the pipeline such that a signal passes through the pipeline registers, so as to partially connect the stages of the pipeline to thereby reduce the number of stages of the pipeline, and the unification cancellation processing being adapted to resume the supply of clocks to the selected pipeline registers and control the pipeline such that the pipeline registers latch the signal in synchronism with the clocks, so as to separate the connected stages of the pipeline to thereby increase the number of stages of the pipeline; and clock frequency changing means for changing a frequency of clocks supplied to the pipeline registers in accordance with the number of stages changed by the stage number changing means.

[Claim 2]

A processing apparatus according to claim 1, wherein the clock frequency changing means changes the clock frequency such that the smaller the number of stages changed by the stage number changing means, the lower the clock frequency, and the larger the number of stages changed by the stage number changing means, the higher the clock frequency.

[Claim 3]

A processing apparatus according to claim 1, wherein the control value changing means uses, as the control value, a value obtained by adding a value obtained by differentiating the deviation with respect to time to a value obtained by performing proportional and integral processing on the deviation.

[Claim 4]

A processing apparatus according to claim 2, wherein the control value changing means uses, as the control value, a value obtained by adding a value obtained by differentiating the deviation with respect to time to a value obtained by performing proportional and integral processing on the deviation.

[Claim 5]

A processing apparatus according to claim 1, wherein the stage number changing means performs the unification processing for decreasing the number of stages when the control value obtained by the control value calculation means is smaller than a predetermined value, and performs the unification cancellation processing for increasing the number of stages when the control value is larger than the predetermined value.

[Claim 6]

A processing apparatus according to claim 2, wherein the stage number changing means performs the unification processing for decreasing the number of stages when the control value obtained by the control value calculation means is smaller than a predetermined value, and performs the unification cancellation processing for increasing the number of stages when the control value is larger than the predetermined value.

[Claim 7]

A processing apparatus according to claim 1, wherein when the control value is equal to or less than a first threshold, the stage number changing means performs the unification processing such that the number of stages changes to the number of stages of a one-class-lower class; and when the control value is equal to or greater than a second threshold greater than the first threshold, the stage number changing means performs the unification cancellation processing such that the number of stages changes to the number of stages of a one-class-higher class.

[Claim 8]

A processing apparatus according to claim 2, wherein when the control value is equal to or less than a first threshold, the stage number changing means performs the unification processing such that the number of stages changes to the number of stages of a one-class-lower class; and when the control value is equal to or greater than a second threshold greater than the first threshold, the stage number changing means performs the unification cancellation processing such that the number of stages changes to the number of stages of a one-class-higher class.

[Claim 9]

A processing apparatus according to claim 1, wherein when both the integral term and the proportional term of the control value are negative, the stage number changing means performs the unification processing such that the number of stages changes to the number of stages of a one-class-lower class; when both the integral term and the proportional term of the control value are positive, the stage number changing means performs the unification cancellation processing such that the number of stages changes to the number of stages of a one-class-higher class; and when the product of the integral term and proportional term of the control value is negative or zero, the stage number changing means does not change the number of stages.

[Claim 10]

A processing apparatus according to claim 1, wherein even when the unification cancellation processing is executed in a certain control period and a condition for performing the unification cancellation processing is satisfied in a control period subsequent to the certain control, the stage number changing means does not perform the unification cancellation processing and maintains the number of stages if the control value or the deviation of the target instruction execution number from the average value of the measured instruction execution number shows a tendency to decrease; and even when the unification processing is executed in a certain control period and a condition for performing the unification processing is satisfied in a control period subsequent to the certain control, the stage number changing means does not perform the unification processing and maintains the number of stages if the control value or the deviation of the target instruction execution number from the average value of the measured instruction execution number shows a tendency to increase.

[Claim 11]

A processing apparatus according to claim 8, wherein even when the unification cancellation processing is executed in a certain control period and a condition for performing the unification cancellation processing is satisfied in a control period subsequent to the certain control, the stage number changing means does not perform the unification cancellation processing and maintains the number of stages if the control value or the deviation of the target instruction execution number from the average value of the measured instruction execution number shows a tendency to decrease; and even when the unification processing is executed in a certain control period and a condition for performing the unification processing is satisfied in a control period subsequent to the certain control, the stage number changing means does not perform the unification processing and maintains the number of stages if the control value or the deviation of the target instruction execution number from the average value of the measured instruction execution number shows a tendency to increase.

[Claim 12]

A processing apparatus according to claim 1, wherein the stage number changing mean restricts the switching of the number of stages to a number of stages of a first class in which the control value or the deviation associated with the set target instruction execution number becomes negative and a number of stages of a second class which is adjacent to the first class and in which the control value or the deviation becomes positive.

[Claim 13]

A processing apparatus according to claim 8, wherein the stage number changing mean restricts the switching of the number of stages to a number of stages of a first class in which the control value or the deviation associated with the set target instruction execution number becomes negative and a number of stages of a second class which is adjacent to the first class and in which the control value or the deviation becomes positive.

[Claim 14]

A processing apparatus according to claim 10, wherein the stage number changing mean restricts the switching of the number of stages to a number of stages of a first class in which the control value or the deviation associated with the set target instruction execution number becomes negative and a number of stages of a second class which is adjacent to the first class and in which the control value or the deviation becomes positive.

[Claim 15]

A processing apparatus according to claim 1, wherein a number of stages at which the control value or the deviation associated with the set target instruction execution number becomes negative is defined as a number of stages of a first class; a number of stages which is a number of stages of a class adjacent to the first class and at which the control value or the deviation becomes positive is defined as a number of stages of a second class; and when the number of stages before being changed is the number of stages of the first class, the control value is corrected in accordance with the number of stages before being changed, so as to increase the probability at which the number of stages of the second class is selected.

[Claim 16]

A processing apparatus according to claim 8, wherein a number of stages at which the control value or the deviation associated with the set target instruction execution number becomes negative is defined as a number of stages of a first class; a number of stages which is a number of stages of a class adjacent to the first class and at which the control value or the deviation becomes positive is defined as a number of stages of a second class; and when the number of stages before being changed is the number of stages of the first class, the control value is corrected in accordance with the number of stages before being changed, so as to increase the probability at which the number of stages of the second class is selected.

[Claim 17]

A processing apparatus according to claim 10, wherein a number of stages at which the control value or the deviation associated with the set target instruction execution number becomes negative is defined as a number of stages of a first class; a number of stages which is a number of stages of a class adjacent to the first class and at which the control value or the deviation becomes positive is defined as a number of stages of a second class; and when the number of stages before being changed is the number of stages of the first class, the control value is corrected in accordance with the number of stages before being changed, so as to increase the probability at which the number of stages of the second class is selected.

[Claim 18]

A processing apparatus according to claim 10, wherein the number of stages can be changed to a maximum number of stages, an intermediate number of stages, and a minimum number of stages; and the control value calculation means corrects the control value in accordance with the number of stages before being changed such that the probability at which the intermediate number of stages is selected increases.

[Claim 19]

A processing apparatus according to claim 1, further comprising supply voltage control means for lowering supply voltage in accordance with the number of stages and the clock frequency in control performed at the number of stages changed by the stage number changing means.

[Claim 20]

A processing apparatus according to claim 19, wherein the supply voltage control means gradually decreases or increases the supply voltage when the number of stages is changed.

[Claim 21]

A processing apparatus according to claim 19, further comprising DVS control means for continuously changing the clock frequency and the supply voltage in accordance with the control value when the number of stages is changed by the stage number changing means.